US011636306B2

(12) United States Patent
Brasnett et al.

(10) Patent No.: US 11,636,306 B2
(45) Date of Patent: Apr. 25, 2023

(54) IMPLEMENTING TRADITIONAL COMPUTER VISION ALGORITHMS AS NEURAL NETWORKS

(71) Applicant: Imagination Technologies Limited, Kings Langley (GB)

(72) Inventors: Paul Brasnett, West Molesey (GB); Daniel Valdez Balderas, Staines-upon-Thames (GB); Cagatay Dikici, London (GB); Szabolcs Cséfalvay, Hemel Hempstead (GB); David Hough, Watford (GB); Timothy Smith, London (GB); James Imber, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 909 days.

(21) Appl. No.: 16/418,322

(22) Filed: May 21, 2019

(65) Prior Publication Data
US 2019/0354844 A1 Nov. 21, 2019

(30) Foreign Application Priority Data
May 21, 2018 (GB) ..................................... 1808323

(51) Int. Cl.
*G06N 3/00* (2006.01)
*G06N 3/02* (2006.01)
(Continued)

(52) U.S. Cl.
CPC .............. *G06N 3/02* (2013.01); *G06F 17/15* (2013.01); *G06F 17/16* (2013.01); *G06N 3/063* (2013.01); *G06N 3/08* (2013.01)

(58) Field of Classification Search
CPC ........ G06N 3/063; G06N 3/08; G06N 3/0454; G06N 3/0481; G06N 3/02; G06N 3/105;
(Continued)

(56) References Cited

U.S. PATENT DOCUMENTS

| 6,983,065 | B1 * | 1/2006 | Akgul | G06V 10/449 |
| | | | | 356/73.1 |
| 9,576,217 | B2 * | 2/2017 | Melikian | G06V 10/462 |

(Continued)

FOREIGN PATENT DOCUMENTS

| CN | 105447493 A | * | 3/2016 | ........... G06K 9/4609 |
| CN | 106446930 A | * | 2/2017 | ........... G06K 9/4671 |

(Continued)

OTHER PUBLICATIONS

Wang et al; "Learnable Histogram: Statistical Context Features For Deep Neural Networks"; International Conference on Computer Analysis of Images and Patterns; Sep. 17, 2016; pp. 246-262.
(Continued)

*Primary Examiner* — Naum Levin
(74) *Attorney, Agent, or Firm* — Potomac Law Group, PLLC; Vincent M DeLuca

(57) ABSTRACT

Methods and systems for implementing a traditional computer vision algorithm as a neural network. The method includes: receiving a definition of the traditional computer vision algorithm that identifies a sequence of one or more traditional computer vision algorithm operations; mapping each of the one or more traditional computer vision algorithm operations to a set of one or more neural network primitives that is mathematically equivalent to that traditional computer vision algorithm operation; linking the one or more network primitives mapped to each traditional computer vision algorithm operation according to the sequence to form a neural network representing the tradi-
(Continued)

tional computer vision algorithm; and configuring hardware logic capable of implementing a neural network to implement the neural network that represents the traditional computer vision algorithm.

17 Claims, 23 Drawing Sheets

(51) Int. Cl.
*G06F 17/15* (2006.01)
*G06F 17/16* (2006.01)
*G06N 3/063* (2023.01)
*G06N 3/08* (2023.01)

(58) Field of Classification Search
CPC ......... G06N 3/082; G06F 17/15; G06F 17/16; G06F 8/40; G06V 20/40
See application file for complete search history.

(56) References Cited

U.S. PATENT DOCUMENTS

| | | | |
|---|---|---|---|
| 9,922,432 B1* | 3/2018 | Risser | G06T 11/001 |
| 10,387,774 B1* | 8/2019 | Cao | G06N 3/08 |
| 10,482,337 B2* | 11/2019 | Balasubramanian | G06N 3/04 |
| 10,600,184 B2* | 3/2020 | Golden | G06T 7/11 |
| 10,650,222 B2* | 5/2020 | Olsen | A63F 13/42 |
| 11,150,777 B2* | 10/2021 | Kaehler | G06F 3/04815 |
| 2004/0122785 A1 | 6/2004 | Brown et al. | |
| 2018/0018451 A1* | 1/2018 | Spizhevoy | H04L 63/0861 |
| 2018/0053056 A1* | 2/2018 | Rabinovich | A63F 13/211 |
| 2019/0380278 A1* | 12/2019 | Burden | B25J 19/0054 |

FOREIGN PATENT DOCUMENTS

| | | | | |
|---|---|---|---|---|
| CN | 106557759 A | * | 4/2017 | ......... G06K 9/00818 |
| CN | 107908646 A | * | 4/2018 | ........... G06F 16/583 |
| CN | 108052977 A | * | 5/2018 | ............. G06K 9/342 |
| CN | 108154183 A | * | 6/2018 | |
| CN | 108197538 A | * | 6/2018 | ........... G06F 16/583 |
| CN | 106780448 B | * | 7/2018 | ........... G06K 9/4685 |
| CN | 104933420 B | * | 11/2018 | ......... G06K 9/00664 |
| CN | 109069929 A | * | 12/2018 | ........... A63F 13/213 |
| CN | 110221681 A | * | 9/2019 | ............. G06F 3/015 |
| JP | 2019028700 A | * | 2/2019 | |
| TW | 202123166 A | * | 6/2021 | ............... G06F 3/14 |
| WO | 2017/206156 A1 | | 12/2017 | |

OTHER PUBLICATIONS

Handa et al., "gvnn: Neural Network Library for Geometric Computer Vision," European Conference on Computer Vision 2016 Workshops, Amsterdam, Netherlands, Oct. 2016, Proceedings Part III, pp. 1-16.

Ma et al., "ALAMO: FPGA Acceleration of Deep Learning Algorithms with a Modularized RTL Compiler," Integration, the VLSI Journal 62 (2018), pp. 14-23.

Peemen et al., "Memory-Centric Accelerator Design for Convolutional Neural Networks," Proceedings of the 2013 IEEE 31st International Conference on Computer Design (ICCD), Oct. 2013.

Yu et al., "Instruction Driven Cross-Layer CNN Accelerator with Winograd Transformation on FPGA," IEEE 2017 International Conference on Field Programmable Technology (ICFPT), 2017, pp. 227-230.

* cited by examiner

IMAGE GRADIENTS

IMPLEMENTING TRADITIONAL COMPUTER VISION ALGORITHMS AS NEURAL NETWORKS

BACKGROUND

A Deep Neural Network (DNN) is a form of artificial neural network comprising a plurality of interconnected layers that enable the DNN to perform signal processing tasks, including, but not limited to, computer vision tasks. FIG. 1 illustrates an example DNN 100 that comprises a plurality of layers 102-1, 102-2, 102-3. Each layer 102-1, 102-2, 102-3 receives input data, processes the input data in accordance with the layer to produce output data. The output data is either provided to another layer as the input data or is output as the final output data of the DNN. For example, in the DNN 100 FIG. 1 the first layer 102-1 receives the original input data 104 to the DNN 100 and processes the input data in accordance with the first layer 102-1 to produce output data. The output data of the first layer 102-1 becomes the input data to the second layer 102-2 which processes the input data in accordance with the second layer 102-2 to produce output data. The output data of the second layer 102-2 becomes the input data to the third layer 102-3 which processes the input data in accordance with the third layer 102-3 to produce output data. The output data of the third layer 102-3 is output as the output data 106 of the DNN.

The processing that is performed on the input data to a layer depends on the type of layer. For example, each layer of a DNN may be one of a plurality of different types. Example DNN layer types include, but are not limited to: a convolution layer, an activation layer, a normalisation layer, a pooling layer and a fully connected layer. It will be evident to a person of skill in the art that these are example DNN layer types and that this is not an exhaustive list and there may be other DNN layer types.

For a convolution layer the input data is processed by convolving the input data using weights associated with that layer. Specifically, each convolution layer is associated with a plurality of weights $w_0 \ldots w_g$ which may also be referred to as filter weights or coefficients. The weights are grouped to form or define one or more filters, which may also be referred to as kernels. One or more of the filters may be associated with an offset bias b.

Reference is made to FIG. 2 which illustrates an example overview of the format of data utilised in a DNN. As can be seen in FIG. 2, the data 200 used in a DNN may be formed of a plurality of matrices. The input data may be arranged as P matrices of data, where each matrix has a dimension x×y. A DNN may comprise one or more convolution layers each of which has associated therewith a plurality of filters formed by a plurality of weights. Each filter has a dimension m×n×P and is applied to the input data according to a convolution operation across several steps in direction s and t, as illustrated in FIG. 2. The number of filters and the number of weights per filter may vary between convolution layers. A convolutional neural network (CNN), which is a specific type of DNN that is effective for image recognition and classification, generally comprises a plurality of convolution layers.

An activation layer, which typically, but not necessarily follows a convolution layer, performs one or more activation functions on the input data to the layer. An activation function takes a single number and performs a non-linear mathematical operation on it. In some examples, an activation layer may act as rectified linear unit (ReLU) by implementing a ReLU function (i.e. $f(x)=\max(0,x)$) or a Parametric Rectified Linear Unit (PReLU) by implementing a PReLU function.

A normalisation layer is configured to perform a normalizing function, such as a Local Response Normalisation (LRN) Function on the input data. A pooling layer, which is typically, but not necessarily inserted between successive convolution layers, performs a pooling function, such as a max or mean function, to summarise subsets of the input data. The purpose of a pooling layer is thus to reduce the spatial size of the representation to reduce the number of parameters and computation in the network, and hence to also control overfitting.

A fully connected layer, which typically, but not necessarily follows a plurality of convolution and pooling layers takes a single or multi-dimensional set of input data values and outputs an N dimensional vector. Where the DNN is used for classification N is the number of classes and each value in the vector represents the score of a certain class. The N dimensional vector is generated through a matrix multiplication of a set of weights against the input data values, optionally followed by a bias offset. A fully connected layer thus receives a set of weights and a bias.

DNNs are currently widely used for many artificial intelligence (AI) applications including computer vision, speech recognition, robotics etc. While DNNs produce superior results for many AI tasks, DNNs are computationally complex to implement. Accordingly, a significant amount of time and energy has been spent developing DNN accelerators that allow DNNs to be implemented in an efficient manner (e.g. in a manner that requires less silicon area or less processing power when operating). DNN accelerators comprise hardware logic that can be configured to process input data to a DNN in accordance with the layers of that DNN. Specifically, DNN accelerators comprise hardware logic configured to process the input data to each layer in accordance with that layer and generate output data for that layer which either becomes the input data to another layer or becomes the output of the DNN. For example, if a DNN comprises a convolution layer followed by an activation layer the DNN accelerator for that DNN may comprise hardware logic configured to perform a convolution on the input data to the DNN using the weights and biases associated with that convolution layer to produce output data for the convolution layer, and hardware logic configured to apply an activation function to the input data to the activation layer (i.e. the output data of the convolution layer) to generate output data for the DNN.

To be able to implement a DNN in an efficient manner a DNN accelerator typically comprises hardware logic that is efficient at processing, or implementing, each layer type. Specifically, a DNN accelerator typically comprises hardware logic that is efficient at performing convolution, activation, pooling, normalisation and full connection operations.

The embodiments described below are provided by way of example only and are not limiting of implementations which solve any or all of the disadvantages of known DNN accelerators.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for implementing a traditional computer vision algorithm as a neural network. The methods include: receiving a definition of the traditional computer vision algorithm that identifies a sequence of traditional computer vision algorithm operations; mapping each traditional computer vision algorithm operation to one or more neural network primitives, from a plurality of neural network primitives, that are mathematically equivalent to that traditional computer vision algorithm operation; linking the one or more network primitives mapped to each traditional computer vision algorithm operation according to the sequence to form a neural network representing the traditional computer vision algorithm; and configuring hardware logic capable of implementing a neural network to implement the neural network that represents the traditional computer vision algorithm.

A first aspect provides a method of implementing a traditional computer vision algorithm as a neural network, the method comprising: receiving a definition of the traditional computer vision algorithm that identifies a sequence of one or more traditional computer vision algorithm operations; mapping each of the one or more traditional computer vision algorithm operations to a set of one or more neural network primitives, that is mathematically equivalent to that traditional computer vision algorithm operation; linking the one or more network primitives mapped to each traditional computer vision algorithm operation according to the sequence to form a neural network representing the traditional computer vision algorithm; and configuring hardware logic capable of implementing a neural network to implement the neural network that represents the traditional computer vision algorithm.

A second aspect provides a system for implementing a traditional computer vision algorithm as a neural network, the system comprising: hardware logic capable of implementing a neural network; and a converter configured to: receive a definition of the traditional computer vision algorithm that identifies a sequence of one or more traditional computer vision algorithm operations; map each of the one or more traditional computer vision algorithm operations to a set of one or more neural network primitives that is mathematically equivalent to that traditional computer vision algorithm operation; link the one or more network primitives mapped to each traditional computer vision algorithm operation according to the sequence to form a neural network representing the traditional computer vision algorithm; and configure the hardware logic capable of implementing a neural network to implement the neural network that represents the traditional computer vision algorithm.

A third aspect provides a computer-implemented automated tool for forming a neural network, the automated tool having access to a library of mappings from traditional computer vision algorithm operations to mathematically equivalent sets of one or more neural network primitives, wherein the automated tool is configured to: receive a definition of a traditional computer vision algorithm that identifies a sequence of one or more traditional computer vision algorithm operations; use the library to map each of the one or more traditional computer vision algorithm operations to a set of one or more neural network primitives that is mathematically equivalent to that traditional computer vision algorithm operation; link the one or more network primitives mapped to each computer vision algorithm operation according to the sequence to form a neural network representing the computer vision algorithm; and output a definition of the neural network for use in configuring hardware logic to implement the neural network.

A fourth aspect provides a neural network accelerator configured to implement a neural network that represents a traditional computer vision algorithm, the neural network having been generated by mapping each traditional computer vision algorithm operation forming the traditional computer vision algorithm to a mathematically equivalent sequence of one or more neural network primitives.

The DNN accelerators described herein may be embodied in hardware on an integrated circuit. There may be provided a method of manufacturing, at an integrated circuit manufacturing system, the DNN accelerator. There may be provided an integrated circuit definition dataset that, when processed in an integrated circuit manufacturing system, configures the system to manufacture the DNN accelerator. There may be provided a non-transitory computer readable storage medium having stored thereon a computer readable description of a DNN accelerator that, when processed in an integrated circuit manufacturing system, causes the integrated circuit manufacturing system to manufacture an integrated circuit embodying a DNN accelerator.

There may be provided an integrated circuit manufacturing system comprising: a non-transitory computer readable storage medium having stored thereon a computer readable description of the DNN accelerator; a layout processing system configured to process the computer readable description so as to generate a circuit layout description of an integrated circuit embodying the DNN accelerator; and an integrated circuit generation system configured to manufacture the DNN accelerator according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
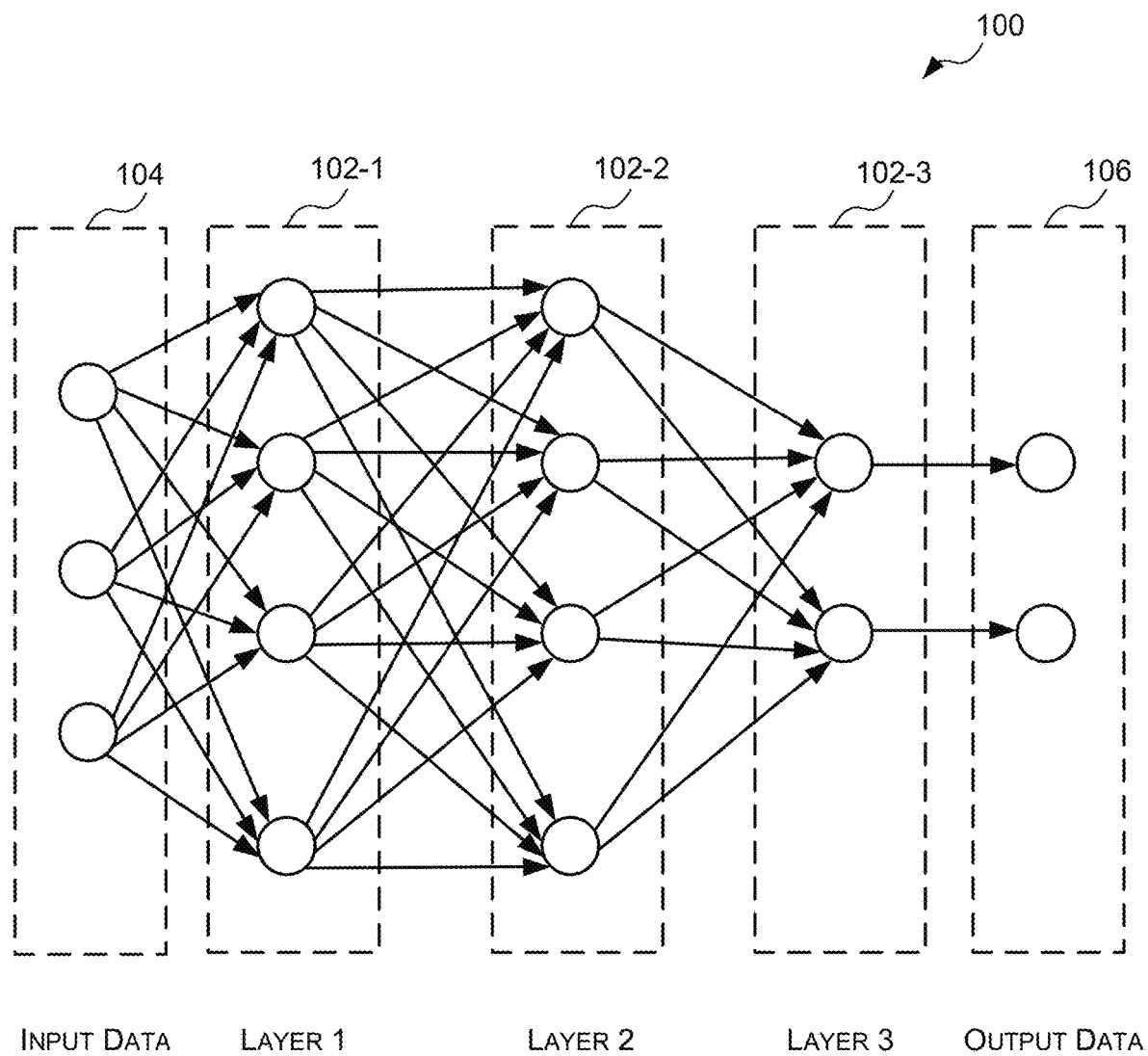
FIG. 1 is a schematic diagram of an example fully connected deep neural network (DNN)
Figure 2:
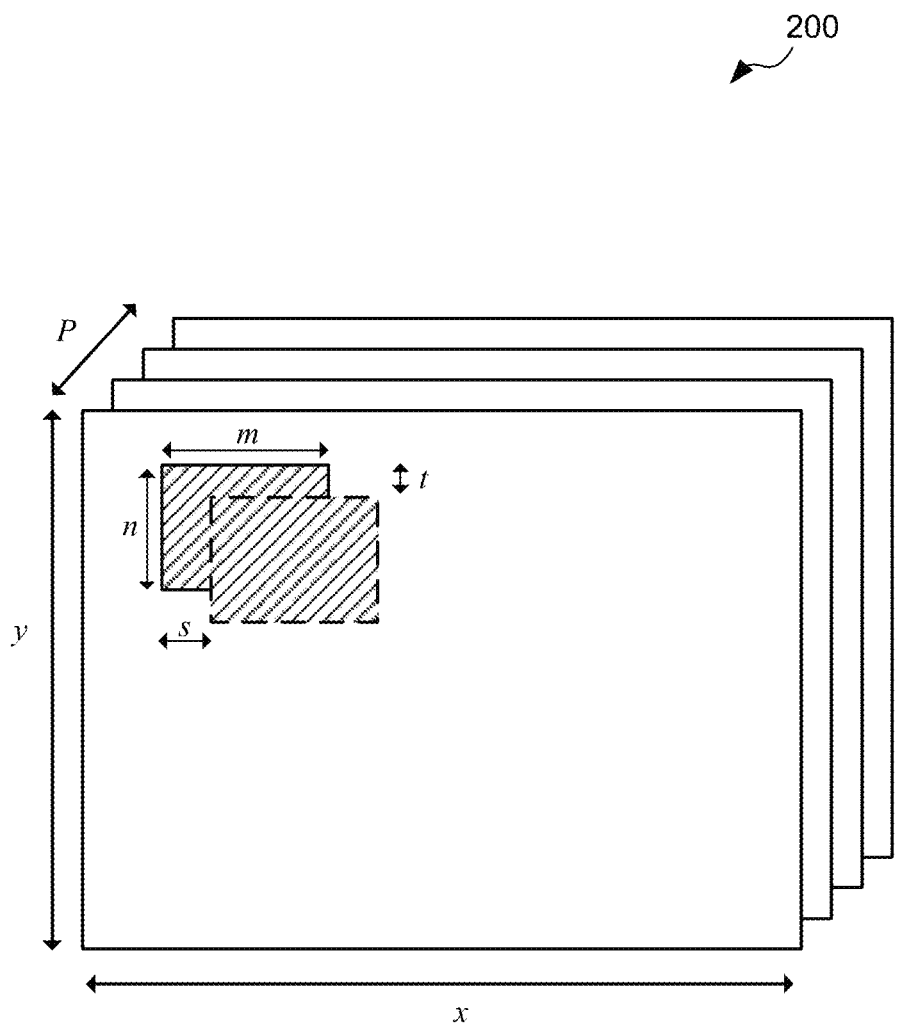
FIG. 2 is a schematic diagram of example input data to a DNN.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

While DNN accelerators are designed to implement or process DNNs, their proficiency at performing certain tasks (i.e. convolutions, pooling, activation, normalisation) means that other algorithms or processes may also be efficiently implemented using a DNN accelerator if they can be represented as a Neural Network—i.e. if the process or algorithm can be represented as a combination of NN primitives or layers. The inventors have identified that one set of algorithms that is particularly suitable for implementation on a DNN accelerator is traditional computer vision algorithms. This is because traditional computer vision algorithms involve making decisions based on an array of image values, so operations such as matrix multiplications/manipulations and non-linear activation functions are useful and DNN accelerators are very well suited to performing these types of operations efficiently.

Computer vision algorithms are algorithms that allow a computer to obtain information from images or multi-dimensional data. Computer vision algorithms can be used, for example, for object classification, object identification and/or object detection. Traditional computer vision algorithms (which may also be referred to as classic or classical computer vision algorithms) are a subset of computer vision algorithms that are pre-programmed to respond to data in a certain way. Traditional computer vision algorithms are used to implement techniques, such as, but not limited to, edge detection, corner detection, object detection, and the like. Traditional computer vision algorithms are typically implemented by executing software on a CPU, GPU or DSP which have well-established instruction sets. In contrast, learning computer vision algorithms are computer vision algorithms that learn from or make predictions from data. Such learning algorithms operate by building a model from an example training set of input observations in order to make data-driven predictions or decisions expressed as outputs, rather than following strictly static program instructions. In other words, each step or operation within a traditional algorithm is well-defined (e.g. defined by the creator of the algorithm) to perform a particular task within the overall algorithm with each step or operation having well-defined results; whereas a learning algorithm (e.g. implemented as a neural network) does not strictly define each step or operation of the algorithm and instead can adjust internal parameters (e.g. weights of neural network layers) with the aim of ensuring that the final output of the whole algorithm provides a suitable result for a given input. In the context of this description, traditional computer vision algorithms can be considered to be any computer vision algorithms which are not in the form of a trainable neural network, e.g. relying on deep or shallow learning techniques. As described herein, a neural network is an interconnected network of multiple computational units that can be organised in layers, where operations on the data involve parameters that the systems can learn automatically through training. Examples of traditional computer vision algorithms include, but are not limited to, Scale-Invariant Feature Transform (SIFT) and Binary Robust Invariant Scalable Keypoints (BRISK) which are feature point extraction and descriptor algorithms. Specifically, SIFT and BRISK identify points of interest in an image and describe regions near the points of interest using a descriptor.

Described herein are methods and systems for implementing a traditional computer vision algorithm as a Neural Network (NN). The methods comprise receiving a definition of a traditional computer vision algorithm that identifies a sequence of one or more traditional computer vision algorithm operations, mapping each traditional computer vision algorithm operation to a set of one or more neural network primitives, and linking the neural network primitives mapped to each operation according to the sequence so as to form a NN representing the traditional computer vision algorithm. Once a NN representing the traditional computer vision algorithm has been generated a DNN accelerator, or other hardware logic capable of implementing a NN, can be configured to implement that NN. Testing has shown that converting traditional computer vision algorithms to neural networks and implementing such neural networks on a DNN accelerator may allow the algorithm to be implemented more efficiently (e.g. in terms of area and/or processing time) than implementing the algorithm on standard processing units such as CPUs, GPUs and DSPs. Furthermore, generating a neural network representation means that the neural network may be trainable, e.g. using traditional neural network training methods and techniques. In these cases, the neural network representation of the traditional computer vision algorithm may be trained prior to implementing the neural network on a DNN accelerator or other hardware logic capable of implementing a NN. This may result in a representation of the traditional computer vision algorithm that performs better than the original traditional computer vision algorithm on which it is based.

Although the methods, systems and techniques described below are described in reference to implementing traditional computer vision algorithms as neural networks it will be evident to a person of skill in the art that the methods, systems and techniques described herein can be equally applied to implement other algorithms as neural networks so that they can be implemented on DNN accelerators. Other types of algorithms which may be suitable for implementation as a neural network may be algorithms that include matrix and vector (or matrix and vector-like) operations which include, but are not limited to, scientific computing algorithms, computer game animation and/or modelling algorithms, audio processing (e.g. for voice recognition), signal processing (e.g. for retrieving data from a received signal) and ray tracing algorithms, e.g. for producing images of 3D scenes or for sound effects.

Figure 3:
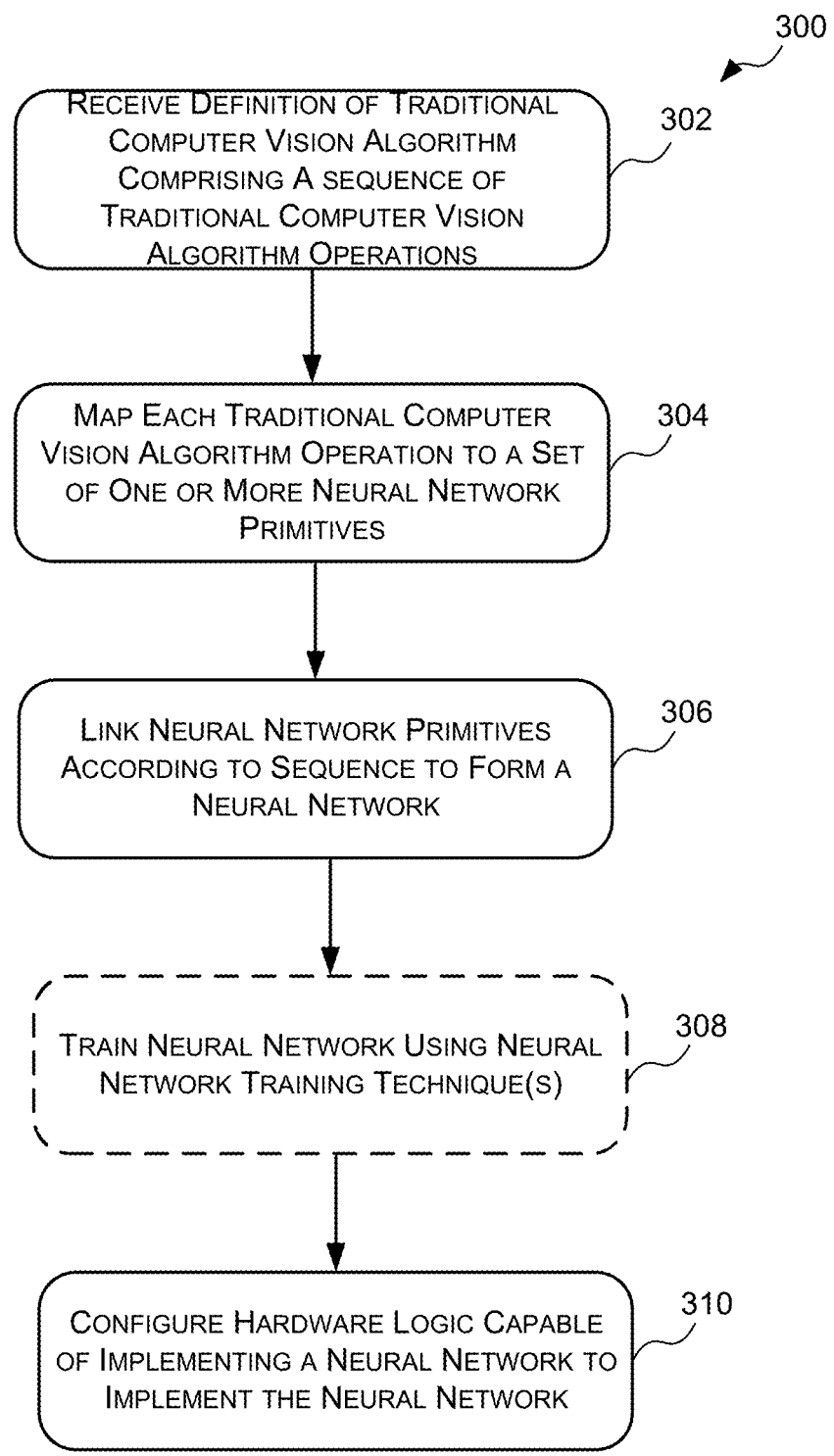
FIG. 3 is a flow diagram of an example method for generating a neural network representation of a traditional computer vision algorithm.

Reference is now made to FIG. 3 which illustrates an example method 300 for implementing a traditional computer vision algorithm as a neural network. In some cases, all, or a portion, of the method 300 may be implemented by a computing-based device such as, but not limited to, the exemplary computing-based device 2100 of FIG. 21. For example, there may be computer program code stored on a computer readable storage medium, which when executed at a computing-based device, causes the computing-based device to implement one or more steps of the method 300 of FIG. 3.

The method 300 begins at block 302 where a definition of the traditional computer vision algorithm is received. The definition of the traditional computer vision algorithm identifies a sequence of one or more traditional computer vision algorithm operations that represent the traditional computer vision algorithm. The term "traditional computer vision algorithm operation" is used herein to mean a mathematical operation that is performed as a part of a traditional computer vision algorithm. Common traditional computer vision algorithm operations include, but are not limited to, an erosion operation, a dilation operation, a histogram operation, a filtering operation and a convolution operation. For example, the definition of the traditional computer vision algorithm may identify a sequence that comprises a convolution operation followed by an erode operation and a dilate operation. Once the definition of the traditional computer vision algorithm has been received the method 300 proceeds to block 304.

At block 304, each traditional computer vision algorithm operation in the identified sequence is mapped to a set of one or more neural network primitives, from a plurality of neural network primitives, wherein the set of one or more neural network primitives is mathematically equivalent to the corresponding traditional computer vision algorithm operation. A neural network primitive is a building block of a neural network and is generally akin to a neural network layer. As described above, a neural network layer defines the inputs to the layer and the mathematical operation(s) that is/are performed on the inputs. Accordingly, a neural network primitive specifies one or more mathematical operations that are to be performed on a set of input data. Example neural network layers include, but are not limited to, a convolution layer, a fully-connected layer, a normalisation layer, a pooling layer, an activation layer and an element-wise operation layer. Accordingly, the set of neural network primitives that the traditional computer vision algorithm operations may be mapped to may comprise one or more of a convolution primitive, a fully-connected primitive, a normalisation primitive, a pooling primitive, an activation primitive and an element-wise operation primitive. Where the neural network representing the traditional computer vision algorithm is to be executed by a DNN accelerator, or the like, that only supports a limited number of neural network layers or primitives the set of neural network primitives to which the traditional computer vision algorithm operations may be mapped may be limited to the neural network primitives that are supported by that DNN accelerator. The number of traditional computer vision algorithm operations is typically significantly larger than the number of neural network primitives therefore many traditional computer vision algorithm operations are mapped to a sequence of neural network primitives.

In some cases, one or more of the neural network primitives may have alternative implementations. For example, an activation primitive may be able to implement one of a plurality of different non-linear functions. Specifically, an activation primitive may be able to implement one or more of a ReLU function, a PReLU function and/or one or more alternative non-linear functions. Some DNN accelerators (such as the DNN accelerator described below with respect to FIG. 20) may include a programmable activation module that can be used to implement any function, even those not traditionally used in a neural network. Similarly, a pooling primitive may be able to implement one of a plurality of different pooling functions. For example, a pooling primitive may be able to implement one or more of a max pooling function, a mean pooling function and/or one or more other pooling functions. The alternative implementations of a primitive are referred to herein as neural-network primitive sub-features. Accordingly, mapping a traditional computer vision algorithm operation to one or more neural network primitives may comprise identifying not only the neural network primitives, but the specific implementations of those primitives (i.e. the sub-features of those primitives).

In some cases, there may be a library which maps common traditional computer vision algorithm operations to one or more mathematically equivalent sets (or sequences) of one or more neural network primitives. For example, as described in more detail below with respect to FIGS. 5 to 9, the inventors have identified (i) that histogram operations are mathematically equivalent to a sequence including a convolution primitive, an activation primitive and a pooling primitive; (ii) that any erosion or dilation operation is mathematically equivalent to a sequence including a convolution primitive followed by an activation primitive; and (iii) that an erosion operation with a square structuring element is mathematically equivalent to a pooling primitive implementing a max pooling function. In these cases, the traditional computer vision algorithm operations may be automatically mapped, by for example a computing-based device, to a set (or sequence) of one or more neural network primitives according to the mappings in the library. Where the library has more than one mapping for a traditional computer vision algorithm operation one of the mappings may be selected based on, for example, the hardware (e.g. DNN accelerator) that is to implement the neural network, the other operations in the algorithm, and/or the NN primitives already selected for other operations Once each traditional computer vision algorithm operation is mapped to a set (or sequence) of one or more neural network primitives the method 300 proceeds to block 306.

At block 306, the neural network primitives to which the traditional computer vision algorithm operations have been mapped are linked in accordance with the sequence of the traditional computer vision algorithm operations to form a neural network. Specifically, the sets of neural network primitives that represent the traditional computer vision algorithm operations are linked in the sequence defined in the traditional computer vision algorithm. In this way the output of a set of neural network primitives representing a traditional computer vision algorithm operation becomes the input to the set of neural network primitives representing the next traditional computer vision algorithm operation in the sequence.

In some cases, once the neural network primitives have been linked to form a neural network that represents the traditional computer vision algorithm the method 300 may proceed directly from block 306 to block 310. In other cases, the method 300 may proceed from block 306 to block 308 prior to proceeding to block 310. Whether the method 300 proceeds to block 308 or block 310 after block 306 may depend on whether the task performed by the neural network may be improved by training; that is, whether the task performed by the neural network is improved by adjusting one or more parameters (e.g. weights) of the neural network via automated processes typically performed in neural network training.

At block 308, the neural network that represents the traditional computer vision algorithm is trained using one or more neural network training techniques or methods. Training a neural network typically involves iteratively running representative inputs through the neural network and adjusting parameters (e.g. weights) of the neural network to maximize or minimize a performance metric of the neural network. Training a neural network may improve the performance of the neural network (e.g. the training may improve the accuracy of the output of the neural network). For example, by using specific training datasets it may be possible to improve the neural network's performance with respect to that dataset. For example, if a traditional computer vision algorithm will be used for images taken in the dark, the neural network representing that algorithm can be trained on such images to maximize its performance under those specific circumstances. By training the neural network the trained neural network may no longer be mathematically equivalent to the original traditional computer vision algorithm, but it may achieve better performance than the original traditional computer vision algorithm. An example of how a BRISK feature descriptor algorithm can be mapped to neural network primitives to form a neural network that represents the BRISK feature descriptor algorithm and how that neural network can be trained using neural network training techniques is described below with respect to FIGS. 15-17. Once the neural network has been trained the method 300 proceeds to block 310.

At block 310, hardware logic capable of implementing a neural network is configured to implement the neural network representing the traditional computer vision algorithm. Configuring hardware logic capable of implementing a neural network to implement a neural network may comprise generating a set of commands that cause the hardware logic to implement the neural network. The commands may specify the number, order and type of layers/primitives etc. In some cases, the hardware logic capable of implementing the neural network is a DNN accelerator. An example DNN accelerator which may be configured to implement a neural network representing a traditional computer vision algorithm is described below with respect to FIG. 20. Testing has shown that some traditional computer vision algorithms can be implemented more efficiently on a DNN accelerator as a neural network than in the traditional format on a CPU, GPU or DSP.

As mentioned above, in some examples, an automated tool is provided with a library of mappings from traditional computer vision algorithm operations to mathematically equivalent sets of one or more neural network primitives, wherein the automated tool is configured to: receive a definition of a traditional computer vision algorithm that identifies a sequence of one or more traditional computer vision algorithm operations; use the library to map each of the one or more traditional computer vision algorithm operations to a set of one or more neural network primitives that is mathematically equivalent to that traditional computer vision algorithm operation; link the sets of one or more network primitives mapped to the traditional computer vision algorithm operations according to the sequence to form a neural network representing the traditional computer vision algorithm; and output a definition of the neural network for use in configuring hardware logic to implement the neural network.

A user (or other application) can provide a definition of a traditional computer vision algorithm to the automated tool, and the automated tool can output a definition of a neural network representing the traditional computer vision algorithm. In this way, the user (or developer of the application) providing the definition of the traditional computer vision algorithm does not need a detailed understanding of the operation of neural networks, but he or she can use the automated tool to form a neural network which represents a traditional computer vision algorithm. The neural networks which are formed in this way (e.g. by the tool) have a structure corresponding to operations of the traditional computer vision algorithm, which allows the (untrained) neural network to be mathematically equivalent to the traditional computer vision algorithm, or which allows the neural network to be trained to thereby improve upon the traditional computer vision algorithm. For example, the neural network could be trained to optimise it for use with particular images, e.g. images of roads and vehicles if the neural network is to be implemented in a vehicle, e.g. for use in an advanced driver-assistance system or an autonomous driving system.

Figure 4:
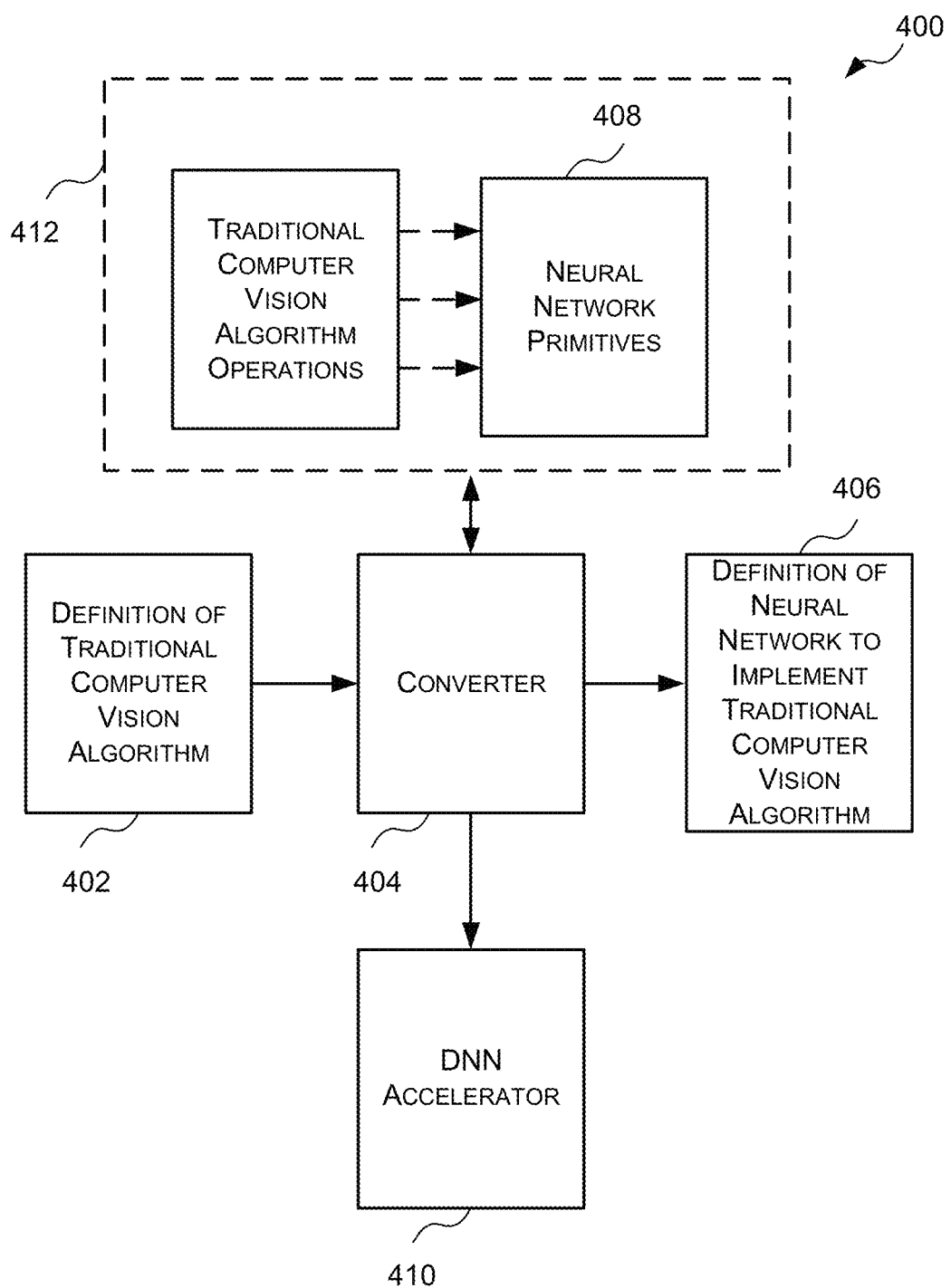
FIG. 4 is a block diagram of an example system for generating a neural network representation of a traditional computer vision algorithm.

Reference is now made to FIG. 4 which illustrates an example system 400 for implementing a traditional computer vision algorithm as a neural network. The system 400 comprises a definition of the traditional computer vision algorithm 402, a converter 404, and a definition of a neural network 406 that represents the traditional computer vision algorithm. As described above, the definition of the traditional computer vision algorithm 402 identifies a sequence of traditional computer vision algorithm operations which form the traditional computer vision algorithm. In some cases, the definition of the traditional computer vision algorithm may be stored as data on a computer readable medium.

The converter 404 is configured to map each of the traditional computer vision algorithm operations identified in the definition of the traditional computer vision algorithm to a set (or sequence) of one or more neural network primitives, from a plurality of available neural network primitives 408, wherein the set of one or more neural network primitives is mathematically equivalent to the traditional computer vision algorithm operation. As described above, the plurality of available neural network primitives 408 may comprise, but is not limited to, one or more of a convolution primitive, a fully-connected primitive, a pooling primitive, an activation primitive and an element-wise operation primitive. The converter 404 may determine that a set (or sequence) of neural network primitives is mathematically equivalent to a traditional computer vision algorithm operation based on a known predetermined relationship between the traditional computer vision algorithm operation and the neural network primitives. For example, in some cases there may be a library 412 that indicates, for each of a plurality of traditional computer vision algorithm operations, one or more sets (or sequences) of one or more neural network primitives that has been identified as being mathematically equivalent to that traditional computer vision algorithm operation. In these cases, the converter 404 may be configured to automatically map each of the traditional computer vision algorithm operations to a set (or sequence) of one or more neural network primitives using the known neural network primitive equivalences listed in the library 412.

Once the traditional computer vision algorithm operations have been mapped to respective sets (or sequences) of one or more neural network primitives that are mathematically equivalent to the corresponding traditional computer vision algorithm operation the converter 404 may link the sequences of neural network primitives in the same manner as their corresponding traditional computer vision algorithm operations so as to form a neural network 406 that represents, and is mathematically equivalent to, the traditional computer vision algorithm.

In this form the neural network has a structure which matches the traditional computer vision algorithm operations in the traditional computer vision algorithm. In other words, the structure of the neural network (e.g. the number of layers in the neural network, the types of layers in the neural network, the sizes of matrices and/or vectors to be manipulated in a neural network layer, etc.) are determined to match the traditional computer vision algorithm operations in the traditional computer vision algorithm. Therefore, the neural network is not a general purpose neural network which has been trained to perform a specific task, but instead the neural network is optimised in terms of its structure for a specific function (i.e. for performing the traditional computer vision algorithm). This means that the neural network is a very efficient representation of the traditional computer vision algorithm, in terms of the size of the neural network (e.g. the number of layers and the sizes of the layers).

Once the neural network 406 representing the traditional computer vision algorithm has been generated the converter 404 may be configured to configure a DNN accelerator 410 (such as, but not limited to, the DNN accelerator 2000 described below with reference to FIG. 20), or other hardware logic that is able to implement a neural network, so as to implement the neural network 406 representing the traditional computer vision algorithm. This enables the DNN accelerator 410, or other hardware logic, to process input data to the traditional computer vision algorithm in accordance with the neural network. In some cases, the converter 404 may be configured to train the neural network using one or more known neural network training techniques prior to configuring the DNN accelerator 410, or other hardware logic, to implement the neural network.

In some cases, the converter 404 may be implemented by a computing-based device, such as the computing-based device 2100 described below with respect to FIG. 21.

Example Vision Algorithm Operations Implemented Using NN Primitives

Figure 5:
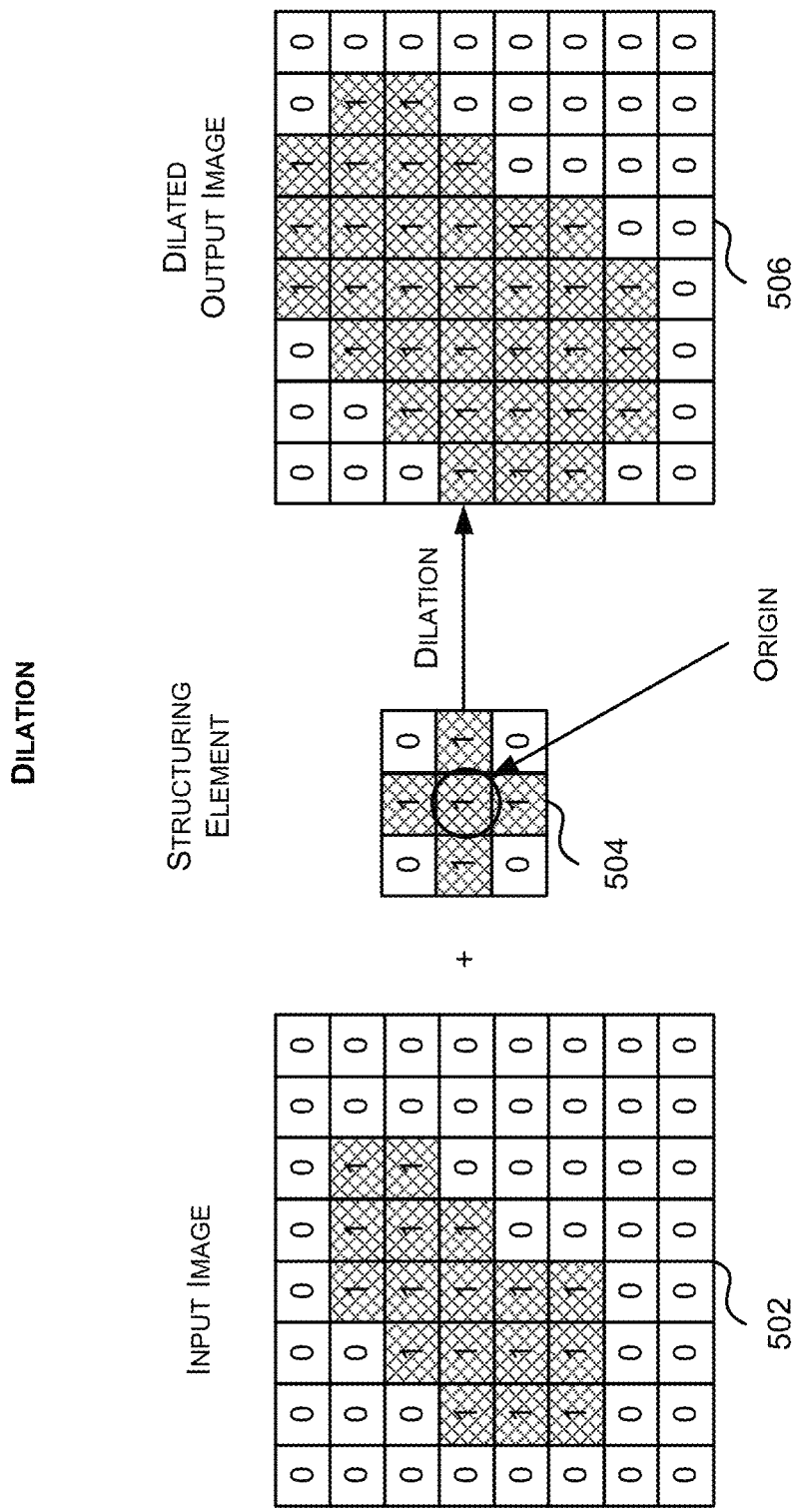
FIG. 5 is a schematic diagram illustrating a dilation operation.
Figure 6:
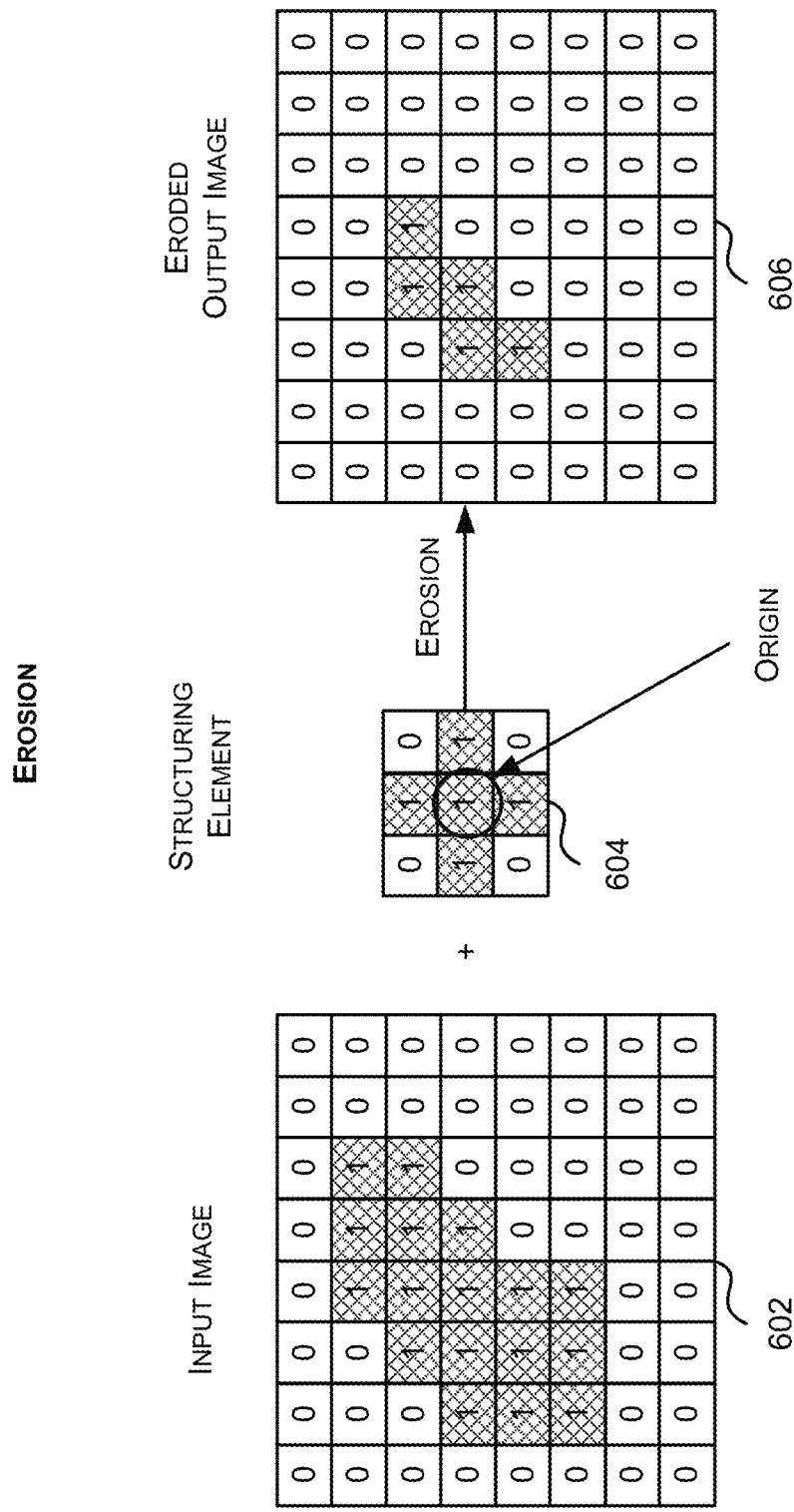
FIG. 6 is a schematic diagram illustrating an erode operation.
Figure 7:
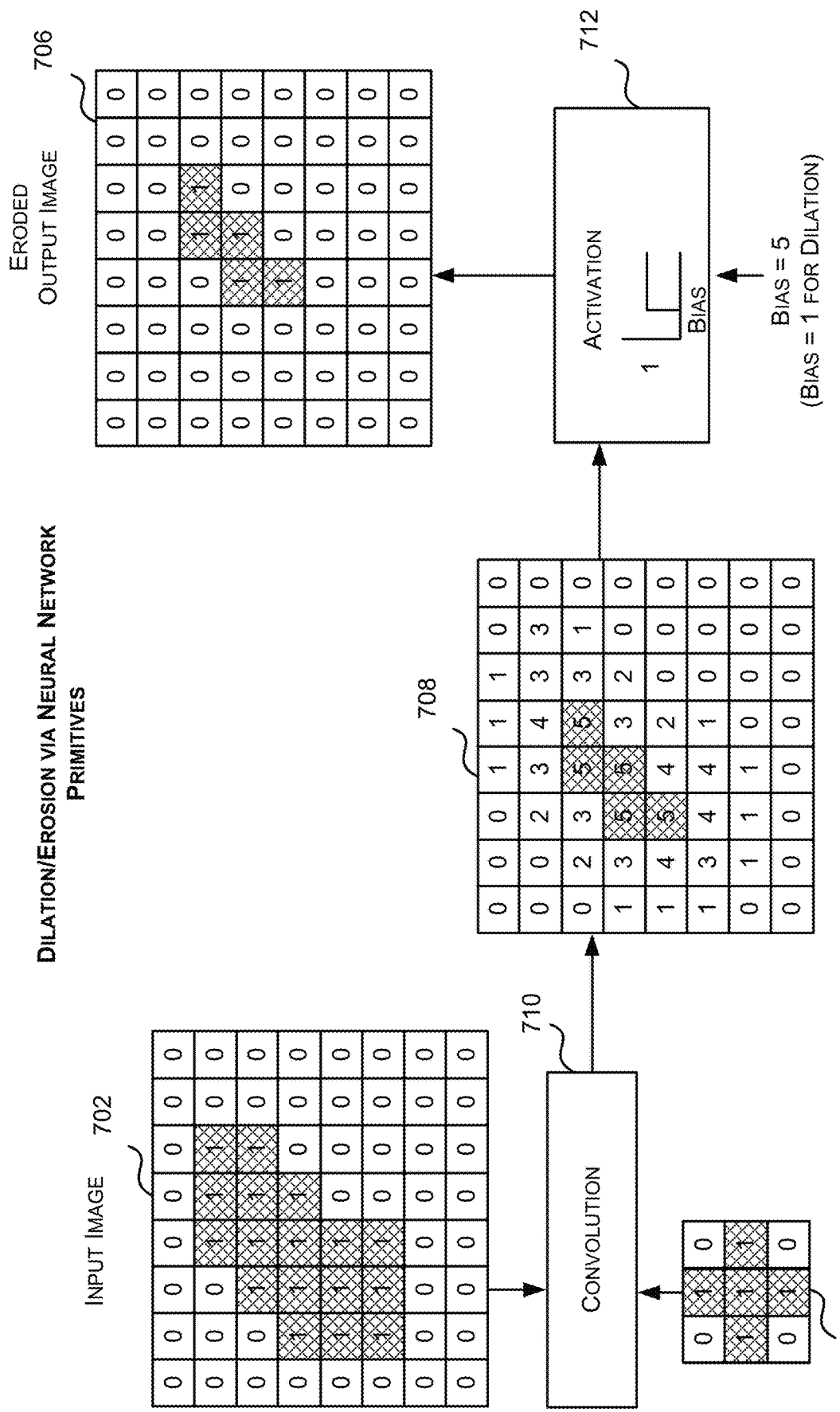
FIG. 7 is a schematic diagram illustrating an example implementation of an erode operation using neural network primitives.
Figure 8:
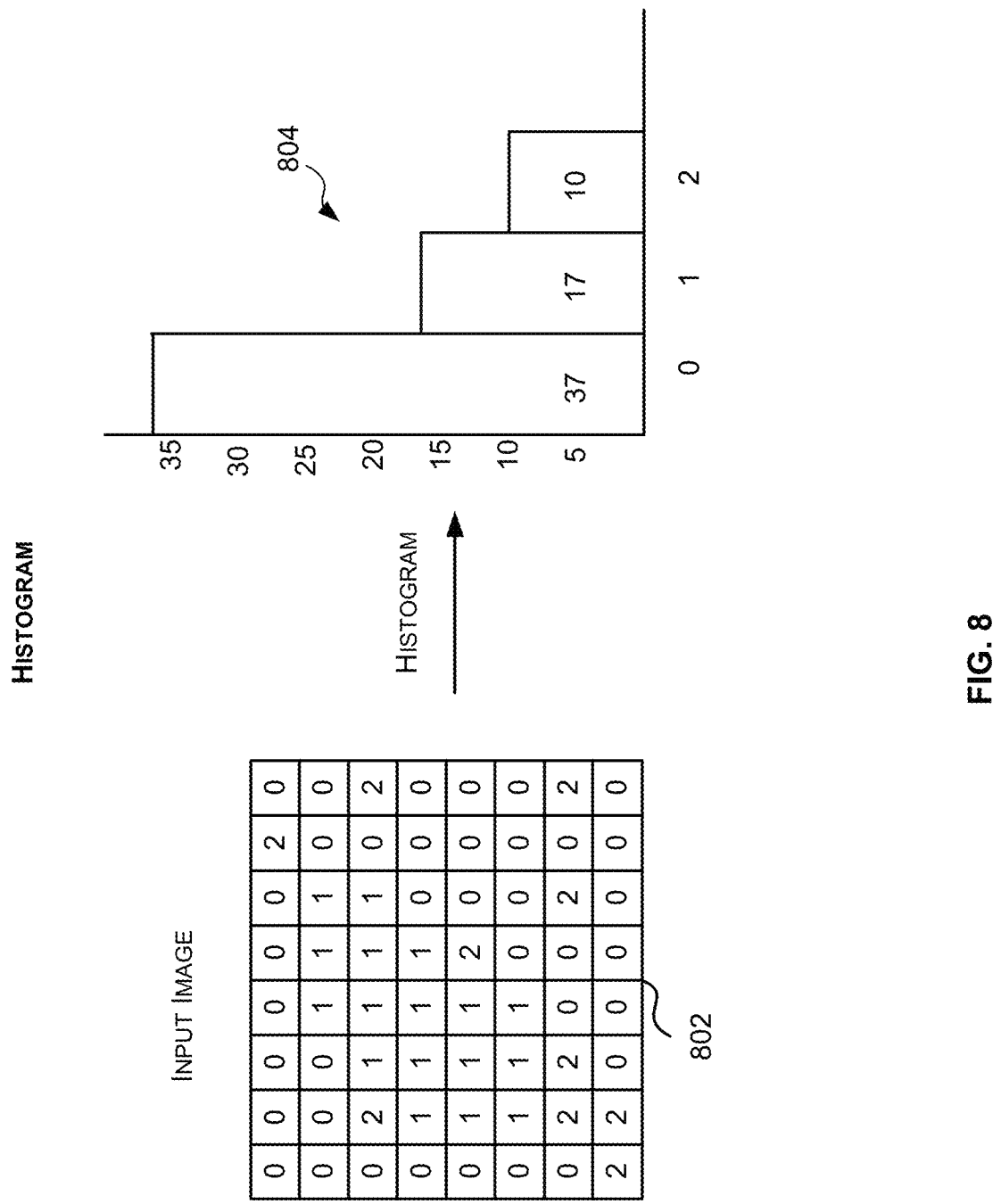
FIG. 8 is a schematic diagram illustrating a histogram operation.
Figure 9:
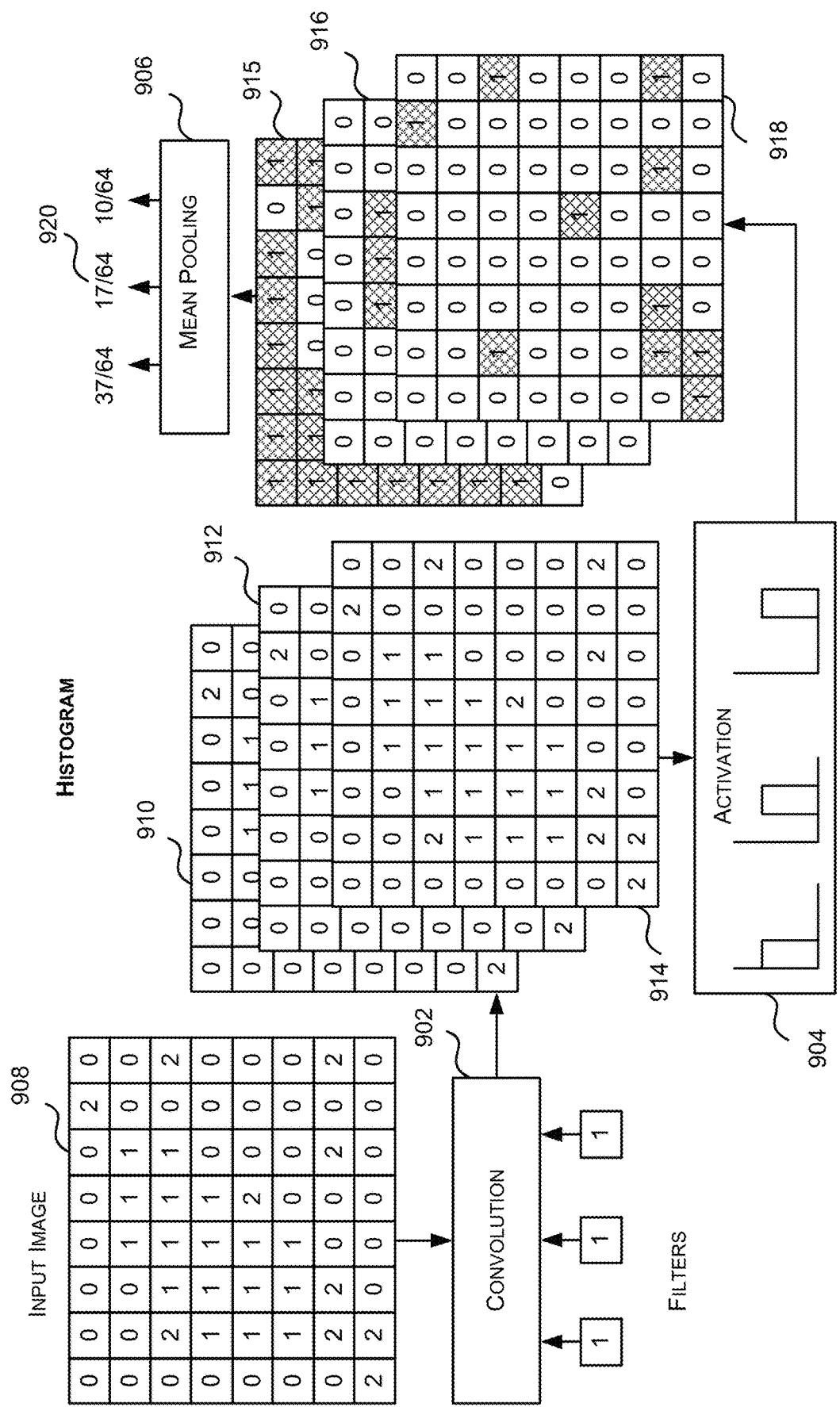
FIG. 9 is a schematic diagram illustrating an example implementation of a histogram operation using neural network primitives.

Reference is now made to FIGS. 5-9 which are used to illustrate example mappings between traditional computer vision algorithm operations and NN primitives. Specifically, FIGS. 5 to 7 are used to illustrate how binary morphological operations can be implemented using NN primitives and FIGS. 8 to 9 are used to illustrate how a histogram operation can be implemented using NN primitives.

Common operations in traditional computer vision algorithms are binary morphological operations. As is known to those of skill in the art, morphological image processing is a collection of non-linear operations related to the shape or morphology of features in an image. Morphological techniques probe a binary image with a small binary image called a structuring element. The structuring element is positioned at all possible locations in the image and it is compared with the corresponding neighbourhood of pixels.

The structuring element can be thought of as a shape mask. The structuring element can be any shape and size that is representable by a matrix of 0's and non-zeros (e.g. 1's). The matrix dimensions specify the size of the structuring element and the pattern of zeros and non-zeros (e.g. 1's) specifies the shape of the structuring element. The origin of the structuring element is usually the location of one of the values of the matrix, although the origin can be outside the structuring element.

The basic binary morphology operations are dilation and erosion. As shown in FIG. 5, the dilation of an image 502 by a structuring element 504 produces a new binary image 506 with ones (1s) in all locations (x, y) of a structuring element's origin at which that structuring element 'hits' the input image and zero (0) otherwise and repeating for all pixel coordinates. A structuring element is said to 'hit' an image if, at least for one of its locations set to one (1) the corresponding image pixel is also set to one (1). A dilation operation expands the connected sets of ones (1s) in the binary image. It can be used for growing features and/or filling in holes and gaps.

As shown in FIG. 6 the erosion of an image 602 by a structuring element 604 produces a new binary image 606 with ones (1s) in all locations (x, y) of a structuring element's origin at which the structuring element 'fits' the input image, and zero (0) otherwise, and repeating for all pixel coordinates (x, y). A structuring element is said to 'fit' the image if, for each of its locations set to one (1), the corresponding image pixel is also set to one (1). An erosion operation shrinks the connected sets of ones (1s) of a binary image. It can be used for shrinking features and/or removing bridges, branches and small protrusions (i.e. for removing noise).

An image may be iteratively eroded and dilated to produce a better image (i.e. an image with less noise).

The inventors have identified that a dilation operation with a square structuring element may be implemented by a pooling primitive, and in particular a pooling primitive that implements a max pooling function. Specifically, a dilation operation with a square structuring element may be implemented by performing a max pooling operation on an a×a window (where a defines the size of the structuring element) at a 1×1 stride (i.e. the pooling is performed on the window at each pixel). Since a max pooling operation determines the maximum value in the window, performing a max pooling function over the structuring element size will produce a 1 when at least one of the pixels in the window is set to 1, and 0 otherwise.

More generally, a dilation or erosion operation with any shaped structuring element may be implemented by a convolution primitive 710 followed by an activation primitive 712 as shown in FIG. 7. Specifically, a convolution operation which is performed between the binary image 702 and the structuring element 704 at a spacing of one pixel will produce an output image 708 where the value of each pixel represents the total number of pixels in the image that have a value of one (1) and the corresponding pixel in the structuring element 704 also has a value of one (1) when the origin of the structuring element is placed at that pixel. The output image 708 produced by the convolution is then converted into an eroded binary image 706 or a dilated binary image by performing an activation operation on the output 708 of the convolution operation wherein if the value of a pixel is greater than or equal to a threshold (e.g. bias) then the value of that pixel is 1 and 0 otherwise. For a dilation the threshold is set to 1 and for an erosion the threshold is set to the number of ones (1s) in the structuring element. For example, in the example of FIG. 7 there are five ones (1s) in the structuring element/filter 704 thus the bias is set to 5 to perform an erosion operation.

It is common to perform a dilation after an erosion (this is referred to as a closing operation). Where an erosion is performed via a convolution primitive and an activation primitive, a pooling primitive implementing a max pooling function could be used to perform a dilation. Thus, a closing operation could be implemented using NN primitives as a convolution primitive, an activation primitive and a pooling primitive implementing a max pooling function. This implementation of a closing operation may be particularly useful in DNN accelerators, such as the DNN accelerator 2000 of FIG. 20, which are able to perform a convolution operation, activation operation and pooling operation in a single pass of the DNN accelerator hardware as it would allow a closing operation to be performed in a single pass of the DNN accelerator hardware.

Another common operation in traditional computer vision algorithms is a histogram operation. As shown in FIG. 8 a histogram operation involves dividing the range of values in the input image 802 into intervals called bins and counting how many values fall within each bin to generate a histogram 804. In the example shown in FIG. 8 the input image 802 is divided into 3 bins that are 1 integer wide. A histogram operation would typically be implemented on a general-purpose computer by iterating through each pixel of an image and incrementing the counter of the bin that it falls in.

The inventors have identified that a histogram operation may be implemented by a convolution primitive 902, followed by an activation primitive 904 and a pooling primitive 906. Specifically, as shown in FIG. 9 a convolution is performed between the input image 908 and h 1×1×1 filters where h is the number of histogram bins. In the example of FIG. 9 there are three bins so there are three 1×1×1 filters. This effectively produces h copies of the input image 910, 912, 914. An activation function is then applied to each image 910, 912, 914 generated by the convolution step wherein only pixels with values in a predetermined range are set to 1, otherwise they are set to zero. A different predetermined range corresponding to one of the bins is used for the activation function for each of the images generated by the convolution step such that the output of the activation stage is h images 915, 916, 918 wherein each image has 1s in the pixels of the original image that had a value falling within a particular bin. A mean pooling function is then performed on each of the h images 915, 916, 918 generated in the activation step. The output 920 of the pooling function is then the total number of pixels of the original image that had a value that fell within that bin divided by the total number of pixels (i.e. F/N where F is the number of pixels of the original image that had a value that fell within that bin and N is the total number of pixels in the image).

It seems quite counter intuitive, from an energy efficiency perspective, to generate h copies of the input image and perform similar operations on each copy, but DNN accelerators are designed to do these types of operations in parallel. Testing has shown that a histogram calculation can be performed more efficiently in this manner using a DNN accelerator than performing the same histogram calculation on a CPU or GPU, particularly considering the silicon (e.g. chip) area of a DNN accelerator vs the silicon (e.g. chip) area of a CPU or GPU.

It will be evident to a person of skill in the art that these are example traditional computer vision algorithm operations only and that there are other traditional computer vision algorithm operations that can be mapped to a sequence of one or more NN primitives. It will also be evident to a person of skill in the art that these are example mappings between traditional computer vision algorithm operations and DNN primitives and that these traditional computer vision algorithm operations may also be implemented using another combination of NN primitives.

Example Implementation of SIFT Feature Detection and Description Using NN Primitives Reference is now made to FIGS. 10 to 14 which illustrate how the Scale Invariant Feature Transform (SIFT) algorithm can be implemented using NN primitives. SIFT is a popular algorithm for both keypoint detection and description. It is popular because it is invariant to image scaling and rotation and partially invariant to changes in 3D view point. SIFT also has good localization of keypoints in spatial and in frequency domains. SIFT also produces a large number of features (e.g. roughly 2000 for a 500×500 pixel image) which are distinctive and stable.

SIFT can be divided into the following four stages: (1) detection of scale-space extrema; (2) location and selection of keypoints; (3) orientation assignment; and (4) keypoint descriptor generation.

Figure 10:
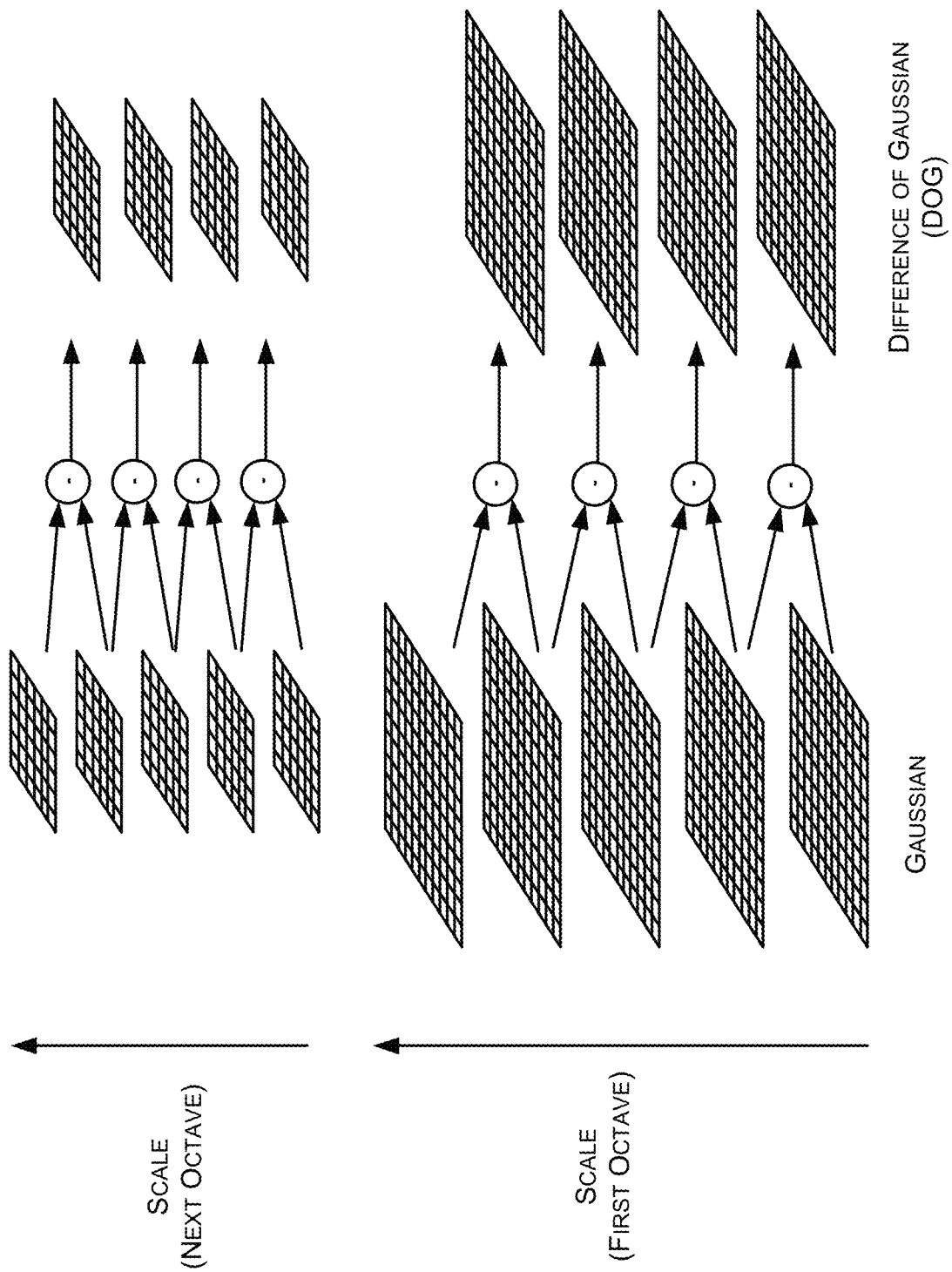
FIG. 10 is a schematic diagram illustrating the first stage of a SIFT algorithm.
Figure 11:
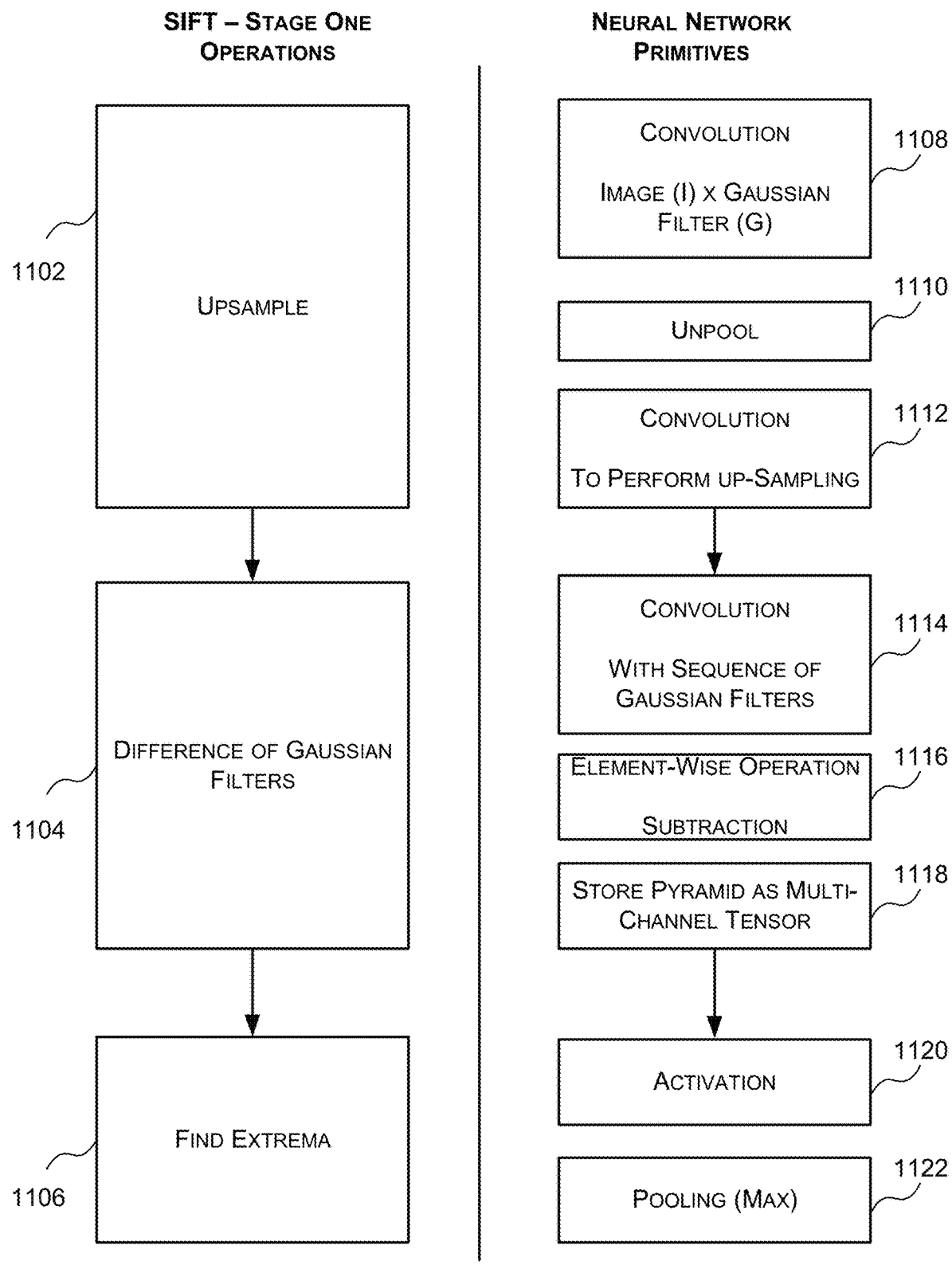
FIG. 11 is a schematic diagram illustrating example mappings between operations of the first stage of the SIFT algorithm and neural network primitives.

The first stage of the SIFT algorithm is described with reference to FIGS. 10 and 11. Specifically, FIG. 10 illustrates how the Differences of Gaussians (DOG) is generated and FIG. 11 illustrates an example flow of traditional computer vision algorithm operations 1102, 1104, 1106 to generate a set of candidate keypoints, and neural network primitives 1108, 1110, 1112, 1114, 1116, 1118, 1120, and 1122 to which those operations can be mapped.

In the first stage of the SIFT algorithm candidate keypoints (i.e. points of interest) in the image are identified. To do this the original image I is convolved with Gaussian filters G at different scales (or σ) (1102) and the difference of successive Gaussian-blurred images (which is referred to as the Differences of Gaussians (DOG)) is determined (1104) as shown in FIG. 10. The DOG image D can thus be calculated in accordance with equation (1):

$$D(x,y,\sigma)=(G(x,y,k\sigma)-G(x,y,\sigma))*I(x,y) \qquad (1)$$

where $G(x,y,k\sigma)$ is the Gaussian blur at scale k.

The keypoints are then identified as those pixels (x, y) of the original image I that maximize or minimize the DOG image D across scales and across spatial coordinates (1106). This is done by comparing each pixel in the DOG images to its eight neighbours at the same scale and nine corresponding neighbouring pixels in each of the neighbouring scales. If the pixel value is the maximum or minimum among the compared pixels, it is selected as a candidate keypoint.

As shown in FIG. 11 the inventors have identified that the Gaussian filtered images at different scales can be mapped to a convolution primitive 1108, a pooling primitive 1110 and another convolution primitive 1112. Specifically, a convolution is performed between the original image I and a Gaussian filter G; the generated image is then unpooled to increase the image size by a factor (e.g. 2) to create a sparse image; and then the image is densified using a pre-trained up-sampling convolution. The inventors have also identified DOG generation can be mapped to a convolution primitive 1114, an element wise operation primitive 1116 configured to perform a subtraction and then storing the output as a multi-channel tensor 1118. Specifically, the output of the first convolution 1112 is convolved with a sequence of Gaussian filters and the difference of the convolved images are generated and the DOGs are stored as a multi-channel tensor. The inventors have also identified that the calculation of the extrema can be mapped to an activation primitive 1120 and a pooling primitive 1122. Specifically, on the DOG pyramid generated at 1118 a per-pixel bias and activation is applied to produce an image map where the extrema are non-zero elements. The bias and the activations are different for maxima and minima and the resulting maps are stored separately. This will result in the minima and maxima appearing as positive values in the map. Max pooling is then applied to the maps recording the position of the extrema in switch variables.

The first stage of the SIFT algorithm typically generates too many candidate keypoints and not all of the candidate keypoints are 'good' keypoints (e.g. invariant to noise) so in the second stage of the SIFT algorithm the number of candidate keypoints is filtered or paired down. The candidate keypoints may be filtered by discarding those candidate keypoints that have low contrast or are edge-like points. Low contrast candidate keypoints and candidate keypoints that are edge-like may be identified by calculating the interpolated location of the extrema. This may be done by interpolating nearby data to accurately determine the position of the keypoint. The interpolation may be done using the quadratic Taylor expansion of the DOG function D with the candidate keypoint as the origin. The extrema is determined as an offset from the current position and if it is greater than 0.5 in any dimension then this is an indication that the extrema is closer to another candidate keypoint. To identify candidate keypoints with a low contrast the value of the second order is computed at the offset. If this is less than a predetermined value the candidate keypoint is discarded. Since the DOG function D will be sensitive to points along an edge the DOG function will often identify points along an edge as keypoints, even if it they are not good keypoints. To eliminate poor edge-like candidate keypoints the principal curvature across the edge and along the edge are determined from a second order Hessian matrix. As is known to those of skill in the art the principal curvatures measure the maximum and minimum bending of a regular surface at each point. Edge-like features are those where the principal curvature of the edge is significantly larger than the principal curvature along the edge.

Figure 12:
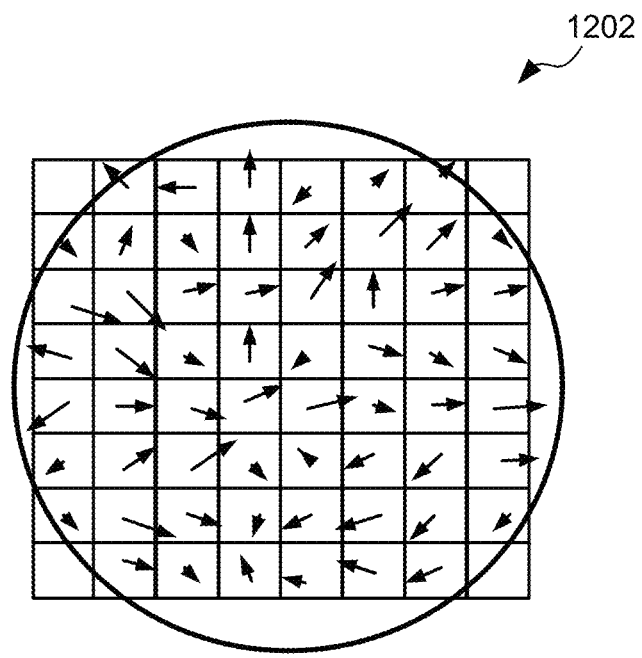
FIG. 12 is a schematic diagram illustrating example gradients of the pixels surrounding a keypoint.

Once the keypoints have been identified via stages one and two, to ensure that the same keypoint will produce the same descriptor regardless of the orientation of the keypoint, in the third stage of the SIFT algorithm the dominant orientation of the keypoints are determined and allocated to the keypoints. To determine the most domination orientation for a keypoint a Gaussian smoothed imaged at the keypoint's scale is generated. This can be implemented in a NN by performing a convolution between the original image I and the Gaussian filter G at the keypoint's scale. The next step is to determine the gradients 1202 near the keypoint as shown in FIG. 12. This can be implemented using NN primitives by performing a convolution between the 16×16 pixels surrounding the keypoint and gradient filters, such as, but not limited to Sobel filters. For example, the Sobel filter $S_x$ shown in equation (2) can be used to identify the x derivative (dx) for each pixel and the Sobel filter $S_y$ shown in equation (3) can be used to identify the y derivative (dy) for each pixel. It will be evident to a person of skill in the art that this is an example only and that other gradient filters may be used.

$$S_x = \begin{bmatrix} +1 & 0 & -1 \\ +2 & 0 & -2 \\ +1 & 0 & -1 \end{bmatrix} \quad (2)$$

$$S_y = \begin{bmatrix} +1 & +2 & +1 \\ 0 & 0 & 0 \\ -1 & -2 & -1 \end{bmatrix} \quad (3)$$

The magnitude and direction of the gradient can then be determined from the x and y derivatives. For example, the magnitude m can be determined from Pythagoras' theorem as the square root of the squares as shown in equation (4) and the direction or angle θ can be determined from equation (5) where the function a tan takes into account the signs of the x and y derivatives (dx and dy) so that the angle θ is in the range [−π, π].

$$m = \sqrt{dx^2 + dy^2} \quad (4)$$

$$\theta = a\tan\left(\frac{dy}{dx}\right) \quad (5)$$

Once the gradient magnitudes and directions have been determined, a histogram of the gradient directions (i.e. angles θ) for the 16×16 set of pixels is generated where there are, for example, 36 bins in the histogram (i.e. each bin covers 10 degrees). As described above, histograms can be implemented in NN primitives by convolving the angle gradients with h 1×1×1 filters (where h is the number of bins—36 in this case), performing an activation function, and then performing a mean pooling function. The keypoint is then assigned the direction associated with the bin with the highest histogram value.

Figure 13:
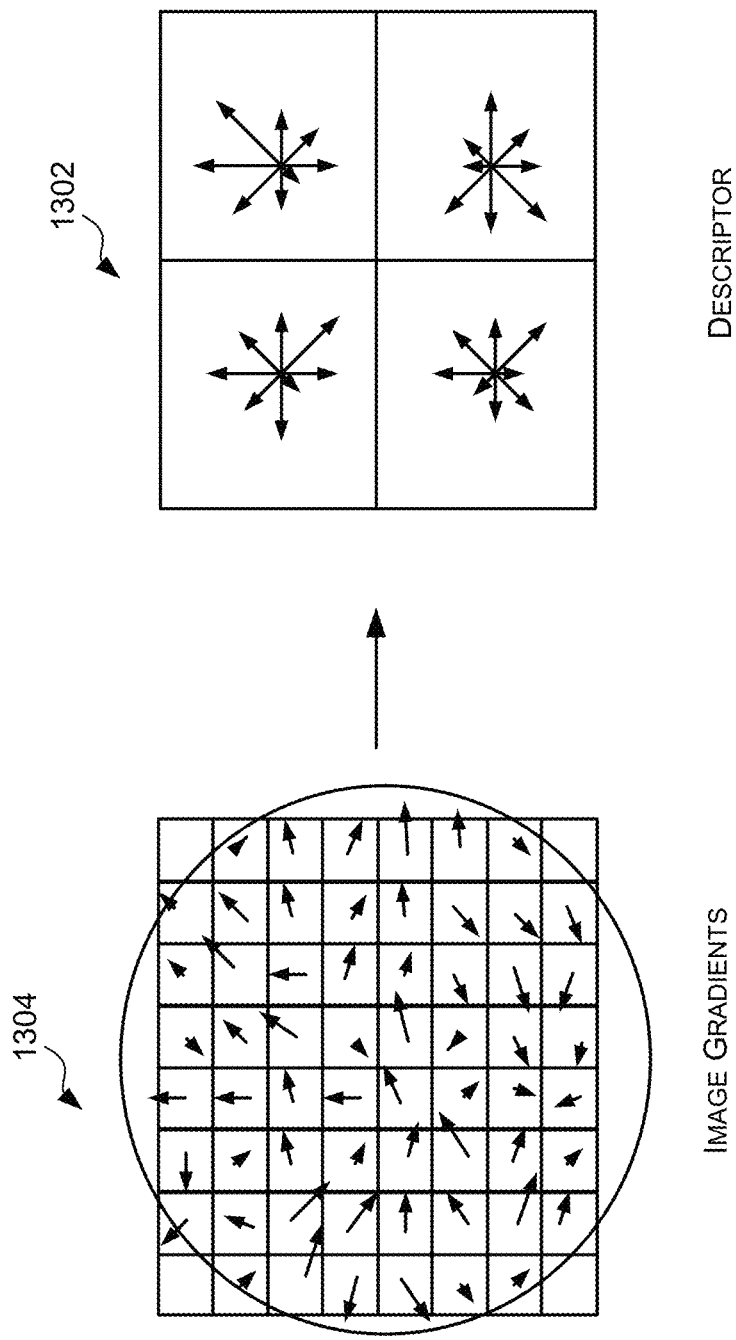
FIG. 13 is a schematic diagram illustrating an example SIFT keypoint descriptor.
Figure 14:
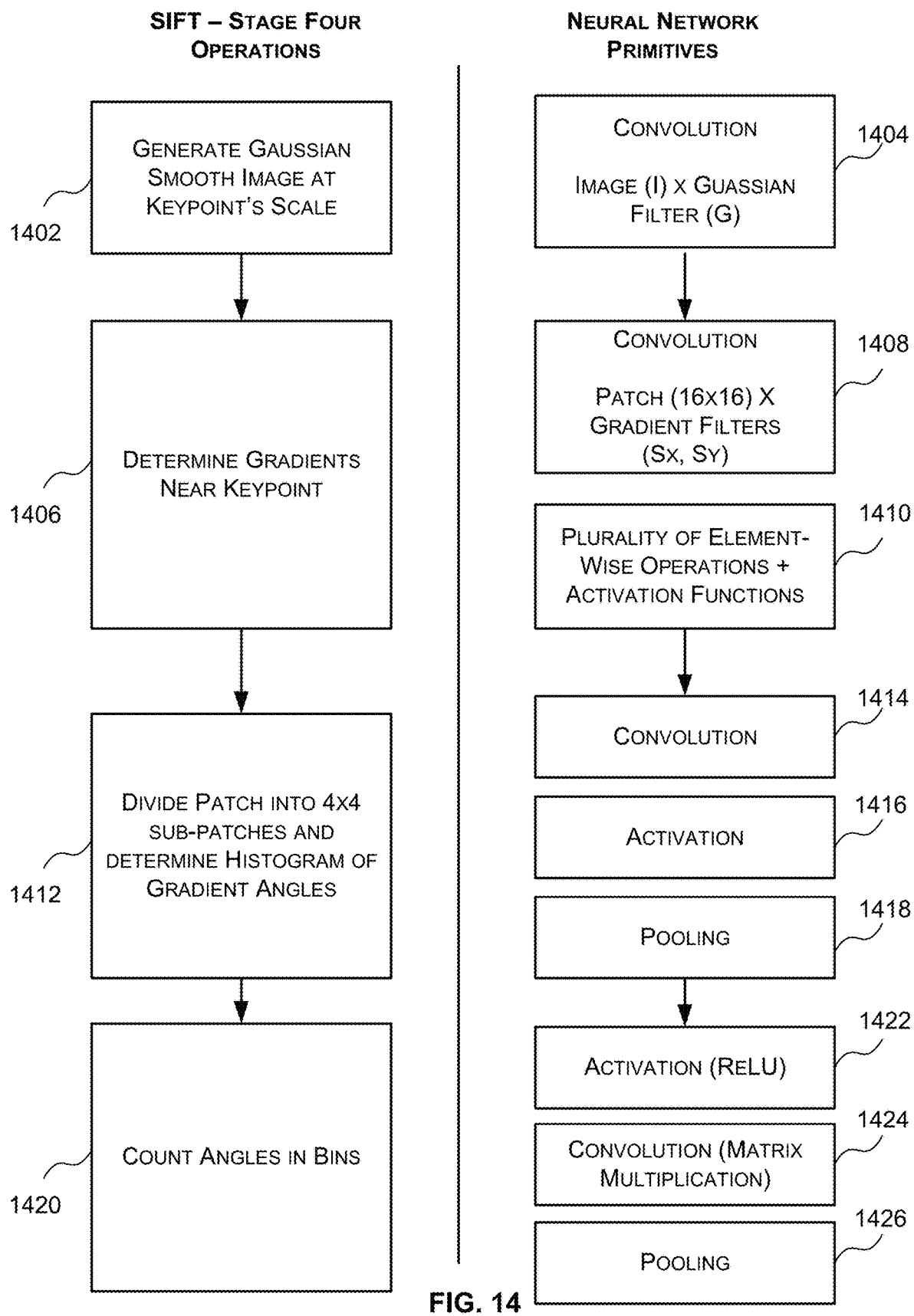
FIG. 14 is a schematic diagram illustrating example mappings between operations of the fourth stage of the SIFT algorithm and neural network primitives.

Once the keypoints have been identified and scales and orientations assigned to them, in stage four of the SIFT algorithm a descriptor is assigned to each keypoint as described with reference to FIGS. 13 and 14. Specifically, FIG. 13 illustrates an example descriptor 1302 that is generated from the gradients 1304 of the patch surrounding the keypoint k and FIG. 14 illustrates an example flow of traditional computer vision algorithm operations 1402, 1406, 1412, 1420 to generate the descriptor 1302 for a keypoint, and neural network primitives 1404, 1408, 1410, 1414, 1416, 1418, 1422, 1424 and 1426 to which those operations can be mapped.

The first step 1402 in generating a descriptor for a keypoint is to generate a Gaussian smoothed image at the keypoint's scale. This operation can be mapped to a convolution primitive 1404 that performs a convolution between the original image I and the Gaussian filter G at the keypoint's scale.

The next step 1406 is to determine the gradients near the keypoint. This operation can be mapped to a convolution primitive 1408 and a set of element-wise operation primitives and activation primitives 1410. Specifically, the convolution primitive 1408 is configured to perform a convolution between the 16×16 pixels surrounding the keypoint and gradient filters (e.g. Sobel filters $S_x$ and $S_y$ described above) to generate the x and y derivatives (dx, dy) of the images. The magnitude m and direction (i.e. angle) of the gradients is then determined from the x and y derivatives via a plurality of element-wise operation primitives and activation primitives 1410. For example, the magnitude may be determined by (i) calculating the square of the x derivatives (dx) using a first element-wise operation primitive that is configured to perform a tensor-multiply (dx, dx) on the x derivatives, (ii) calculating the square of the y derivatives (dy) using a second element-wise operation primitive that is configured to perform a tensor multiply (dy, dy) on the y derivatives; (iii) calculating the sum of the squares of the x and y derivatives (dx and dy) using an element-wise operation primitive that is configured to perform a tensor multiply ($dx^2$, $dy^2$); and (iv) calculating the square root of the sum of the squares using an activation primitive which is configured to apply a square root function to the sum of the squares.

The angle or direction may be calculated by, for example, (i) determining the ratio of the y derivative (dy) and the x derivative (dx) using an element-wise operation primitive that is configured to perform a tensor divide (dy, dx) or is configured to perform a tensor multiply (dy, 1/dx); and (ii) determining the angle or direction using an activation primitive that is configured to apply a $\tan^{-1}$ function on the ratio calculated in (i).

The next step 1412 is to divide the 16×16 patch into sixteen 4×4 patches and to determine a histogram for each 4×4 patch wherein the gradient direction (i.e. angle) is divided into a number of bins, e.g. 8 bins (i.e. each bin covers 45 degrees). As described above, a histogram can be mapped to a convolution primitive 1414, an activation primitive 1416 and a pooling primitive 1418 configured to perform a max pooling.

The final step 1420 is to count the number of angles in each bin (i.e. in each angle range) weighted by the proximity to the range limits. Specifically, each angle in a bin may be weighted by the distance to the centre of the angle range. This operation can be mapped to an activation primitive 1422 which is configured to apply a ReLU function. Each angle in the bin may also be weighted by the gradient magnitude m, and by a Gaussian weighted kernel centred at the patch centre. This operation can be mapped to a convolution primitive 1424 that is configured to perform matrix multiplication. The number of occurrences in each bin is then computed for each 4×4 group of pixels. This operation can be mapped to a pooling primitive 1426.

Accordingly, each SIFT keypoint descriptor 1302 has 128 values—8 values for each 4×4 group of pixels. Each value for a 4×4 pixel effectively indicates the strength of the gradient in that direction.

Example Implementation of BRISK Feature Descriptor Using NN Primitives

Figure 15:
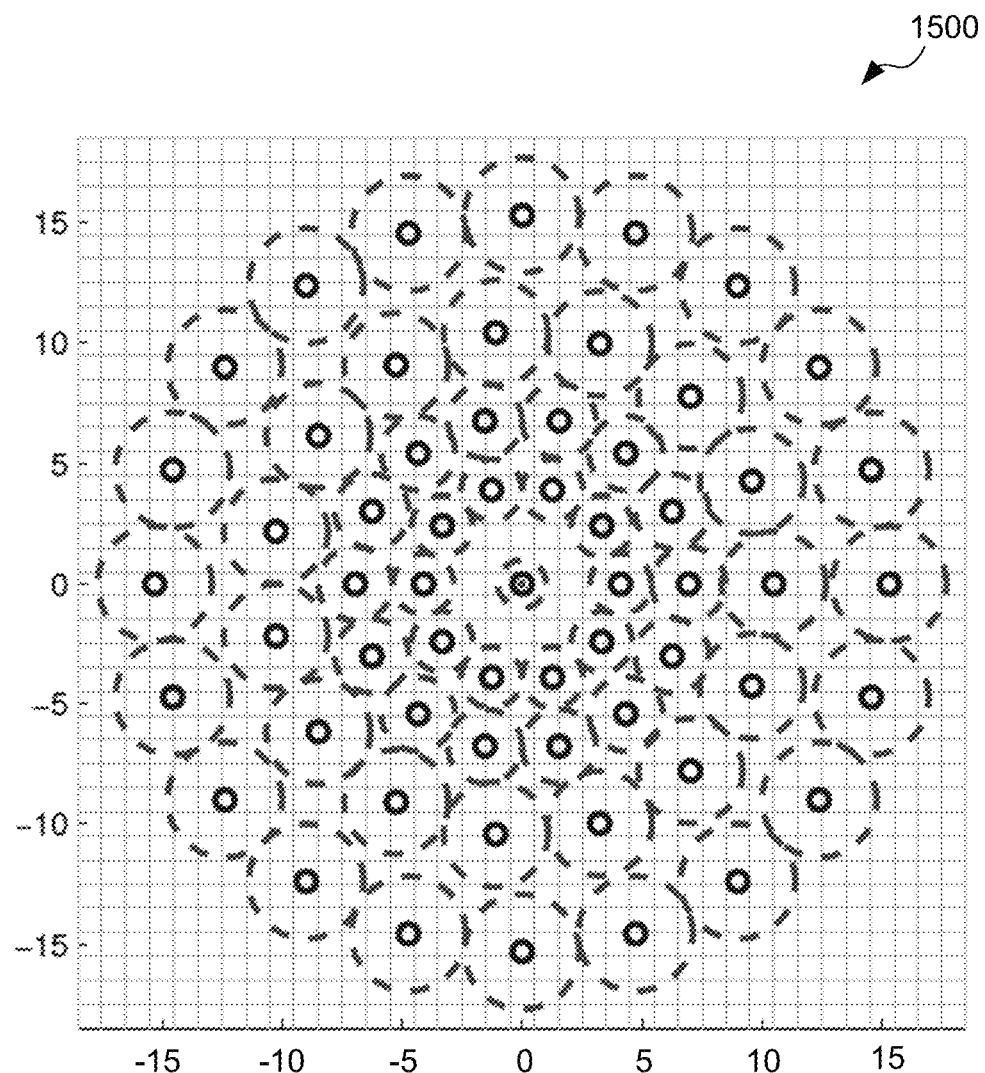
FIG. 15 is a schematic diagram illustrating an example BRISK sampling pattern.
Figure 16:
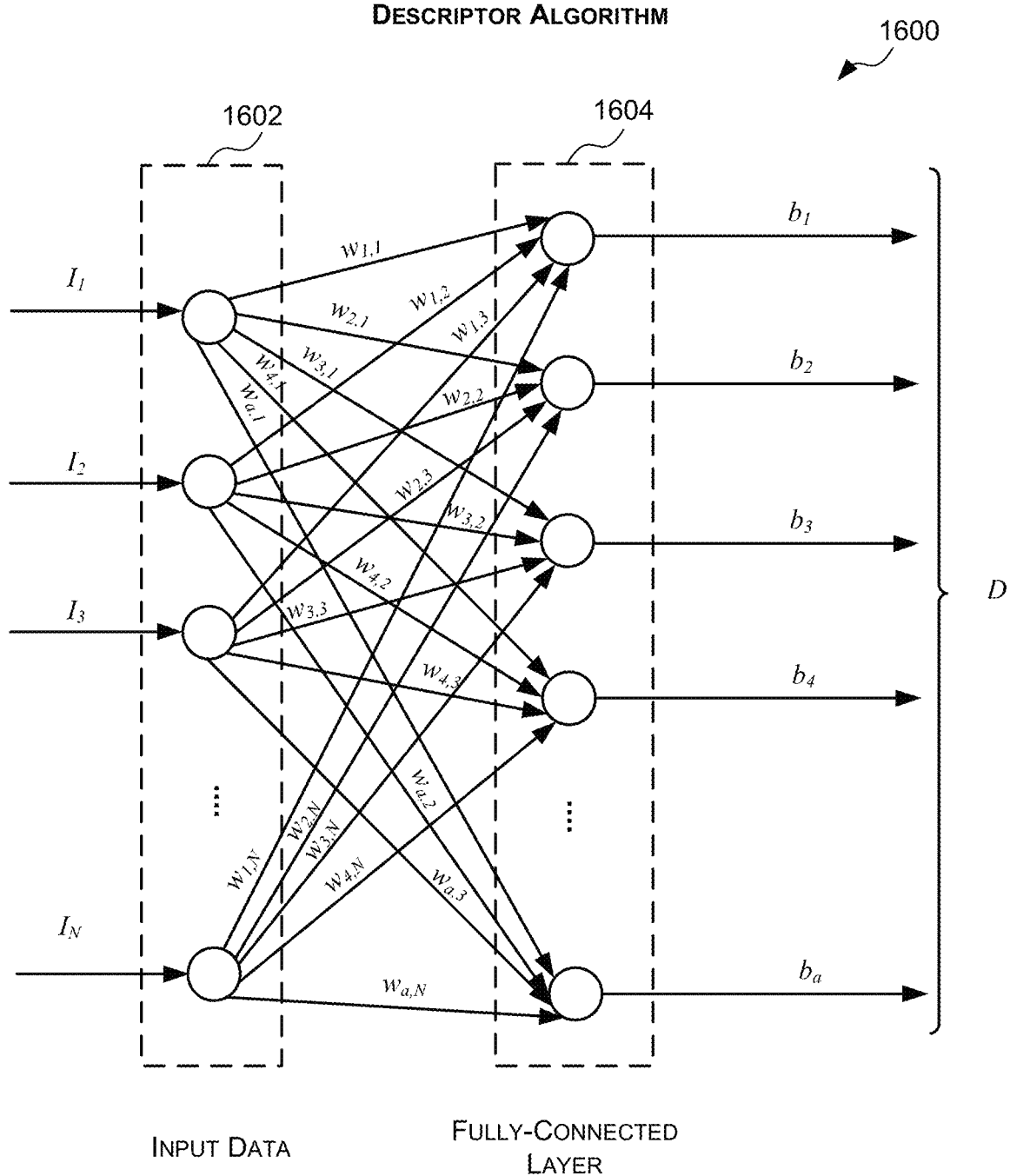
FIG. 16 is a schematic diagram of an example neural network (NN) representation of the BRISK descriptor algorithm.
Figure 17:
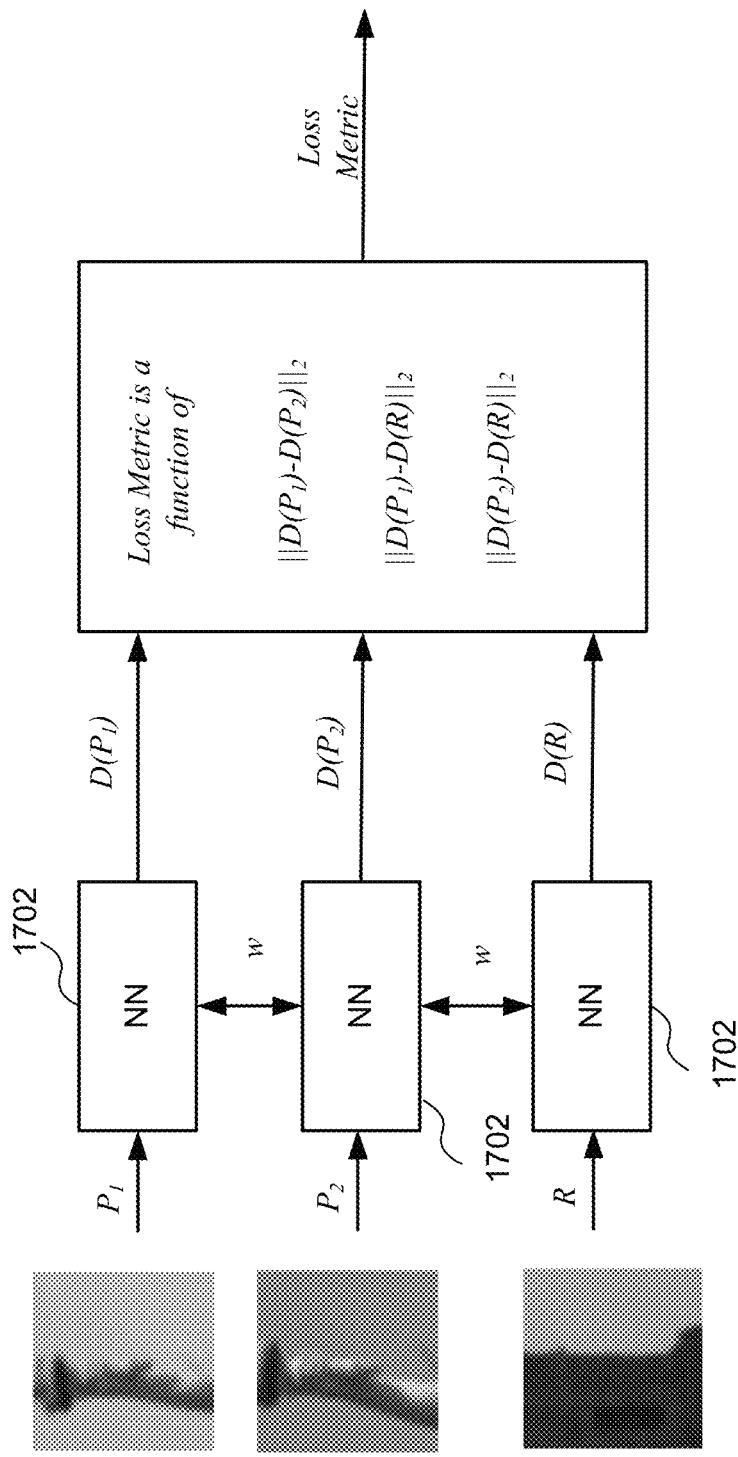
FIG. 17 is a schematic diagram illustrating an example method of training a neural network (NN) representation of the BRISK descriptor algorithm.

Reference is now made to FIGS. 15 to 17 which illustrate how the Binary Robust Invariant Scalable Keypoints (BRISK) feature descriptor algorithm can be implemented using NN primitives. As is known to those of skill in the art, the BRISK feature descriptor algorithm takes N (e.g. 60) samples around a feature point (or keypoint) in accordance with a known sampling pattern. The pattern defines N locations equally spaced on circles concentric with the keypoint k. An example pattern 1500 for N=60 and the scale t=1 is shown in FIG. 15. The sampling pattern is then used to obtain pairwise brightness or intensity comparison results which are assembled into the binary BRISK descriptor. Specifically, a subset of 'short-distance pairings' S of sampling points p is defined as shown in equation (6):

$$S=\{(p_i,p_j)\in A \|p_j-p_i\|<\delta_{max}\}\subseteq A \qquad (6)$$

wherein A is the set of all sampling point points, $\delta_{max}$=9.75t, and t is the scale of the keypoint k. The bit vector descriptor D is assembled by rotating the sampling pattern by $\alpha$ and performing all the short-distance comparisons of the point pairs (i.e. in the rotated pattern), such that each bit b corresponds to a 1 when the intensity I of the first one of the point pair is greater than the intensity of the second one of the point pair and 0 otherwise as shown in equation (7)

$$b = \begin{cases} 1, & I(p_j^\alpha, \sigma_j) > I(p_i^\alpha, \sigma_i) \\ 0, & otherewise \end{cases} \qquad (7)$$

where $I(p_j^\alpha, \sigma_j)$ is the intensity value at sampling point $p_j^\alpha$ (in the rotated pattern) after applying a Gaussian smoothing with standard deviation $\sigma_j$ proportional to the distance between the points on the respective circle. The application of the Gaussian filter avoids aliasing effects when sampling the intensity of a point p. Using a 60-bit sampling pattern and the distance threshold identified above where t=1 results in a 512-bit patch descriptor.

The inventors have identified that equation (7) can be expressed as a matrix-vector multiplication. Specifically, the sampling point pairs can be expressed as a sparse a×N matrix where a the number of sampling point pairs (e.g. 512) and N is the number of sampling points (e.g. 60). Each row of the sparse matrix corresponds to a specific sampling point pair and has a one (1) in the column corresponding to the first sampling point of the pair and a minus one (−1) in the column corresponding to the second sampling point of the pair and the remainder of the elements in that row are set to zero (0). The descriptor (D) is then generated by taking the sigmoid of the sparse matrix multiplied by an N element vector wherein the $i^{th}$ element of the vector comprises the intensity $I_i$ (or smoothed intensity) of the $i^{th}$ sampling point $p_i$, and then rounding to the nearest integer (rint) as shown in equation (8). This will produce a descriptor vector (D) wherein the elements of the vector will have a value of (1) where the first intensity of the pair is larger than the second intensity of the pair, and zero (0) otherwise.

$$D = rint\left(sigmoid\left(\begin{bmatrix} 1 & 0 & \ldots & -1 & \ldots & 0 \\ 0 & 1 & \ldots & 0 & -1 & 0 \\ \vdots & \vdots & \vdots & \vdots & \vdots & \vdots \\ 0 & \ldots & 1 & 0 & \ldots & -1 \end{bmatrix}\begin{bmatrix} I_1 \\ I_2 \\ \vdots \\ I_N \end{bmatrix}\right)\right) \qquad (8)$$

Expressing equation (7) as a matrix multiplication allows equation (7) to be implemented as a single fully-connected layer in a DNN accelerator. In other words, it allows feature descriptors to be generated in accordance with the BRISK feature descriptor algorithm using a DNN accelerator in a mathematically equivalent way to equation (7).

Furthermore, once in this NN format (i.e. expressed as a fully connected NN layer) it is possible to train the NN to potentially achieve better results (i.e. better feature descriptors). Specifically, if equation (8) is written more generally as shown in equation (9) such that the first matrix is a set of weights w which are applied to the intensities I, it is possible to train the NN (i.e. determine the weights) using traditional NN training methods so that the NN will produce more accurate results.

$$D = rint\left(sigmoid\left(\begin{bmatrix} w_{1,1} & \cdots & w_{1,N} \\ \vdots & \ddots & \vdots \\ w_{a,1} & \cdots & w_{a,N} \end{bmatrix}\begin{bmatrix} I_1 \\ I_2 \\ \vdots \\ I_N \end{bmatrix}\right)\right) \quad (9)$$

In this configuration instead of each element ($b_u$) of the descriptor vector being the difference between the intensities of two sampling points (as in equations (7) and (8)) as expressed in equation (10):

$$b_u = rint(sigmoid(I_j - I_i)) \quad (10)$$

each element ($b_u$) of the descriptor is a weighted sum of the intensities of all the sampling points as shown in equation (11):

$$b_u = rint(sigmoid(\Sigma_{i=1}^N w_{u,i} I_i)) \quad (11)$$

FIG. 16 illustrates an example NN implementation 1600 of equation (9).

Specifically, the NN implementation 1600 of equation (9) comprises a single fully-connected layer 1604 which receives as inputs 1602 the N (e.g. 60) intensities $I_i$ and outputs a descriptor D that comprises a (e.g. 512) values ($b_u$) wherein each value $b_u$ is the sum of the $u^{th}$ weights $w_{u,i}$ multiplied by the N (e.g. 60) intensities $I_i$ respectively as set out in equation (11).

As shown in FIG. 17, the NN of equation (9) (i.e. the NN comprising a fully connected layer defined by equation (9)) may be trained, for example, using triplets of patches— wherein each triplet comprises two patches ($P_1$ and $P_2$) that are similar and should produce the same (or similar) feature descriptor, and a third patch (R) which is different to the other two patches ($P_1$ and $P_2$) which should produce a different feature descriptor—and adjusting the weights w to maximize the difference between the patches that are different and to minimize the difference between the patches that are similar. Specifically, for each triplet of patches the three patches ($P_1$, $P_2$, R) are fed into the NN 1702 (i.e. the NN comprising a fully connected layer defined by equation (9)) which is configured with a set of weights w to generate corresponding feature descriptors (D($P_1$), D($P_2$) and D(R)). The distance between each pair of descriptors is computed by for example, equations (12), (13) and (14):

$$\|D(P_1) - D(P_2)\|_2 \quad (12)$$

$$\|D(P_1) - D(R)\|_2 \quad (13)$$

$$\|D(P_2) - D(R)\|_2 \quad (14)$$

During NN training, the values of the weights w are iteratively modified via standard NN procedures of loss minimization so that distances between the descriptors of corresponding patches (e.g. the output of equation (12)) are small, and the distance between the descriptors of non-corresponding patches (e.g. the output of equations (13) and (14)) are large. The loss function is defined in terms of the quantities in equations (12), (13), and (14).

The accuracy of such a NN may be determined by a precision metric and/or a recall metric. The precision metric may be a ratio of the number of true positives to the total number of positives (i.e. the number of true positives and the number of false positives) as shown in equation (15). A true positive (TP) is when the NN produces descriptors for similar patches (e.g. $P_1$ and $P_2$) that are deemed to be corresponding. Two descriptors may be deemed to be corresponding if the distance between the two descriptors is below a predetermined threshold. A false positive (FP) is when the NN produces descriptors for dissimilar patches (e.g. $P_1$ and R, or $P_2$ and R) that are deemed to be corresponding (i.e. the distance between the two descriptors is below a predetermined threshold).

$$\text{precision} = \frac{numTP}{numTP + numFP} \quad (15)$$

The recall metric may be a ratio of the true positives to the sum of the number of true positives and the number of false negatives as shown in equation (16). A false negative (FN) is when the NN produces descriptors for similar patches (e.g. $P_1$ and $P_2$) that are deemed to be not corresponding (i.e. the distance between the two descriptors is equal to or above the predetermined threshold). Typically, the precision metric and the recall metric have an inverse relationship.

$$\text{recall} = \frac{numTP}{numTP + numFN} \quad (16)$$

Figure 18:
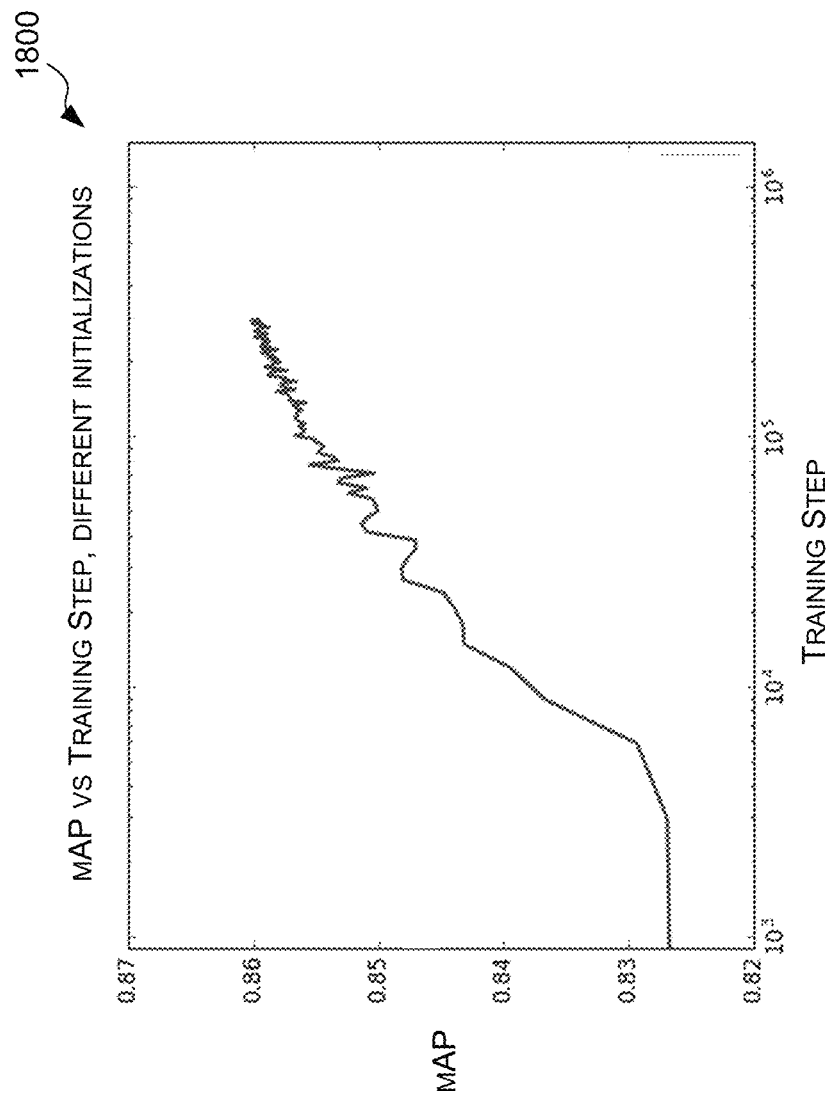
FIG. 18 is a graph of the performance of a neural network (NN) representation of the BRISK descriptor algorithm versus the number of training iterations.

Reference is now made to FIG. 18 which shows a graph 1800 of the accuracy (i.e. mean average precision (mAP)) of the NN versus the number of training iterations. It can be seen from FIG. 18 that the more training iterations that are performed the more accurate the results of the NN are.

The structure of the neural network (e.g. the size of the matrix and the vector, and the use of the sigmoid function as shown in equation (9)) is set up to correspond with (i.e. be mathematically equivalent to) the traditional algorithm for calculating a BRISK descriptor. From this starting point, the neural network can be trained, e.g. by varying the weights w in the matrix of equation (9), to find a better feature descriptor (e.g. for a particular training set) which is no longer mathematically equivalent to the traditional BRISK algorithm.

Figure 19:
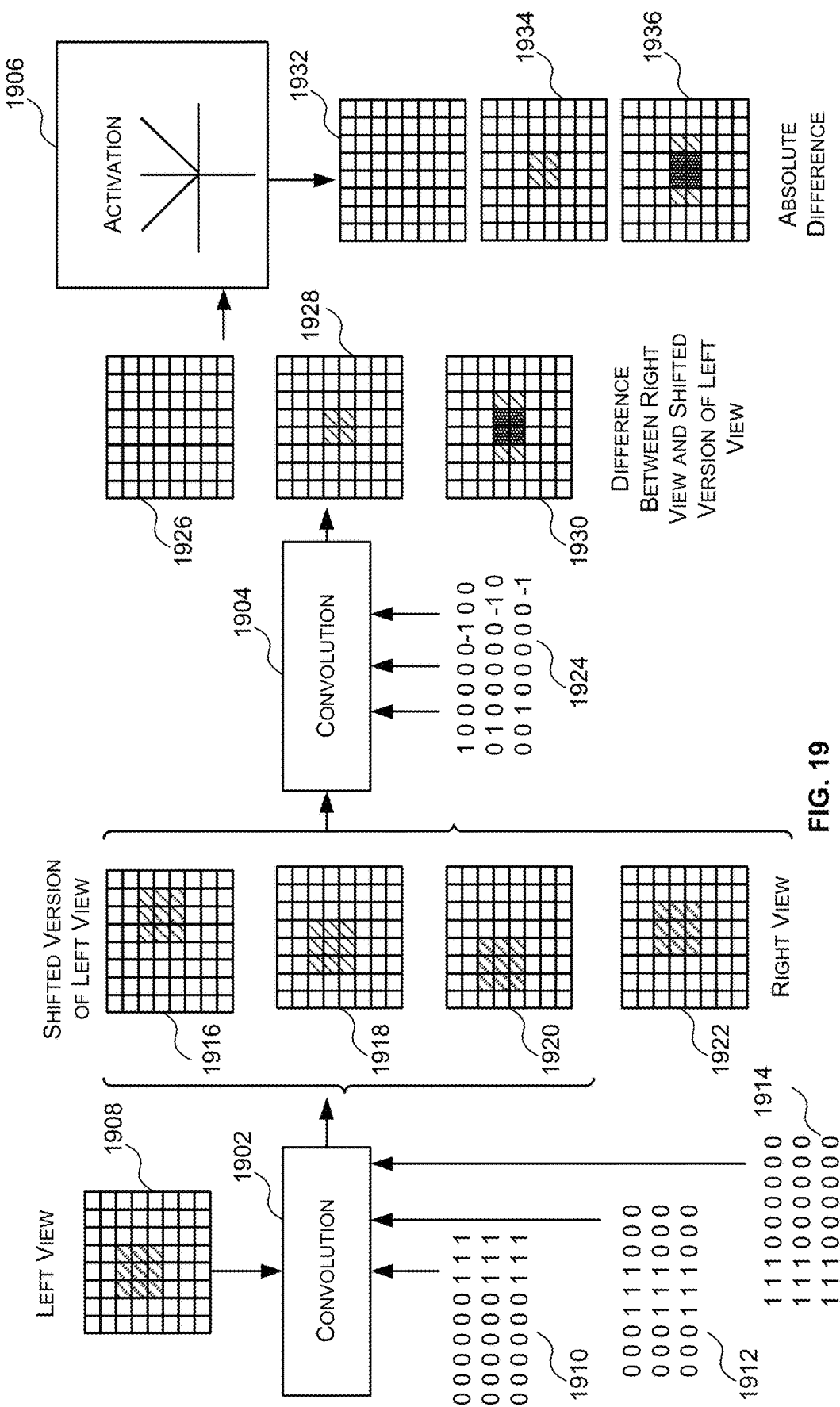
FIG. 19 is a schematic diagram illustrating a neural network (NN) representation of an example stereo disparity estimation algorithm.

Example Implementation of Stereo Disparity Estimation Algorithm Using NN Primitives Reference is now made to FIG. 19 which illustrates an example implementation of a stereo disparity estimation algorithm using NN primitives. As is known to those of skill in the art stereoscopic vision uses the disparity of two camera images looking at the same scene to calculate depth information, just as in human vision. In particular, there is typically a first image that represents the left view of the scene and a second image that represents the right view of the scene. In this manner objects in the camera's field of view will appear at slightly different locations within the two images due to the camera's different perspectives on the scene. Depth information can be computed from a pair of stereo images (i.e. the image representing the left view of the scene and the image representing the right view of the scene) by computing the distance in pixels between the location of a feature in one image and its location in the other image. This produces a disparity map. Generally, pixels with larger disparities are closer to the camera and pictures with smaller disparities are further from the camera.

A standard method for calculating the disparity map is to use block matching. Block matching involves taking a small region of pixels in one image (e.g. the right image) and searching for the closest matching region of pixels in the other image (e.g. the left image). In some cases, the similarity between blocks may be determined according to the sum of absolute differences (SAD). The SAD between a template and a block is calculated by subtracting each pixel in the template from the corresponding pixel in the block and summing the absolute values of the differences. In other cases, the similarity between blocks may be determined according to the sum of squared differences (SSD).

As shown in FIG. 19, the inventors have identified that this block-based method of generating a disparity map may be mapped to a set of NN primitives that comprises: a first convolution primitive 1902, a second convolution primitive 1904 and an activation primitive 1906. Specifically, the first convolution primitive 1902 is configured to convolve an image representing the left view of the scene 1908 with a plurality of filters 1910, 1912, 1914 to generate a plurality of shifted versions 1916, 1918, 1920 of the image representing the left view of the scene. The plurality of shifted versions 1916, 1918, 1920 of the image representing the left view of the scene are concatenated, along with an image representing the right view of the scene, to form a single tensor. The second convolution primitive 1904 is then configured to convolve the single tensor with a set of filters 1924 that generate block-based differences 1926, 1928, 1930 between the image representing the right view of the scene 1922 and the shifted versions 1916, 1918, 1920 of the image representing the left view of the scene. The activation primitive 1906 is then configured to determine the absolute difference 1932, 1934, 1936 of the block-based differences 1926, 1928, 1930. The absolute differences 1932, 1934, 1936 may then be provided to a pooling primitive (not shown) that is configured to sum the values of each absolute difference 1932, 1934, 1936 to generate the L1-norm (i.e. the sum of the absolute difference (SAD)). The same process can then be repeated with the left and right views the opposite way around (i.e. the image representing the right view of the scene 1922 is the input to the first convolution primitive 1902 and the image representing the left view of the scene 1908 becomes part of the tensor). In other cases, instead of using an activation primitive that is configured to apply an absolute function to the block-based differences 1926, 1928, 1930 to generate the L-1 norm, a convolution primitive could be used to multiple each difference by itself to produce the L-2 norm (i.e. the sum of squared difference (SSD)). Various known post-processing algorithms can be used to merge the results and generate a final disparity map.

A similar set of NN primitives may be used to implement motion estimation.

Example DNN Accelerator

Figure 20:
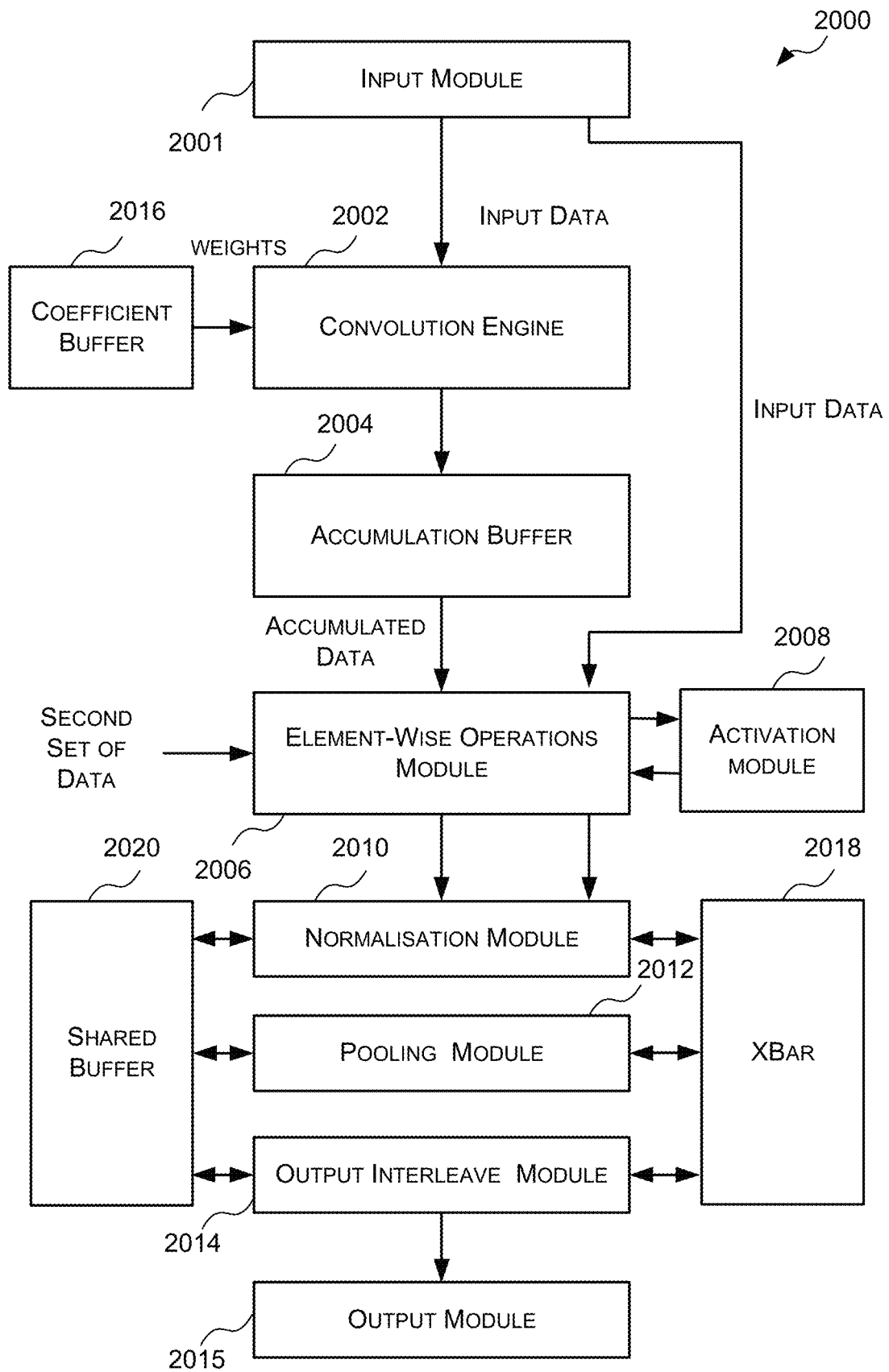
FIG. 20 is a block diagram of an example DNN accelerator.

Reference is now made to FIG. 20 which illustrates an example DNN accelerator 2000 which may be configured to implement a NN generated in accordance with the method of FIG. 3 (i.e. a NN that represents a traditional computer vision algorithm).

The DNN accelerator 2000 of FIG. 20 is configured to compute the output of a DNN through a series of hardware passes (which also may be referred to as processing passes) wherein during each pass the DNN accelerator 2000 receives at least a portion of the input data for a layer of the DNN and processes the received input data in accordance with that layer (and optionally in accordance with one or more subsequent layers) to produce processed data. The processed data is either output to memory for use as input data for a subsequent hardware pass or output as the output of the DNN. The number of layers that the DNN accelerator 2000 can process during a single hardware pass may be based on the size of the data, the DNN accelerator 2000 and the order of the layers. For example, where the DNN accelerator 2000 comprises hardware to perform each of the possible layer types the DNN accelerator 200 may be able to process or implement a DNN comprising a first convolution layer, a first activation layer, a second convolution layer, a second activation layer, and a pooling layer by receiving the initial DNN input data and processing that input data according to the first convolution layer and the first activation layer in the first hardware pass and then outputting the output of the activation layer into memory, then in a second hardware pass receiving that data from memory as the input and processing that data according to the second convolution layer, the second activation layer, and the pooling layer to produce the output data for the DNN.

The example DNN accelerator 2000 of FIG. 20 comprises an input module 2001, a convolution engine 2002, an accumulation buffer 2004, an element-wise operations module 2006, an activation module 2008, a normalisation module 2010, a pooling module 2012, an output interleave module 2014 and an output module 2015. Each module or engine may be implemented by hardware logic and/or digital logic circuitry. Each module or engine implements or processes all or a portion of one or more types of layers. Specifically, together the convolution engine 2002 and the accumulation buffer 2004 implement or process a convolution layer or a fully connected layer. The activation module 2008 processes or implements an activation layer. The normalisation module 2010 processes or implements a normalisation layer. The pooling module 2012 implements a pooling layer and the output interleave module 2014 processes or implements an interleave layer.

The input module 2001 is configured to receive the input data for the current hardware pass and provide it to a downstream module for processing. The downstream module that receives the input data depends on the layers that are to be processed in the current hardware pass.

The convolution engine 2002 is configured to perform a convolution operation on the received input data using the weights associated with a particular convolution layer. The weights for each convolution layer of the DNN may be stored in a coefficient buffer 2016 as shown in FIG. 20 and the weights for a particular convolution layer may be provided to the convolution engine 2002 when that particular convolution layer is being processed by the convolution engine 2002. Where the DNN accelerator 2000 supports variable weight formats then the convolution engine 2002 may be configured to receive information indicating the format or formats of the weights of the current convolution layer being processed to allow the convolution engine 2002 to properly interpret and process the received weights.

The convolution engine 2002 may comprise a plurality of multipliers (e.g. 128) and a plurality of adders which add the result of the multipliers to produce a single sum. Although a single convolution engine 2002 is shown in FIG. 20, in other examples there may be multiple (e.g. 8) convolution engines so that multiple windows can be processed simultaneously. The output of the convolution engine 2002 is fed to the accumulation buffer 2004.

The accumulation buffer 2004 is configured to receive the output of the convolution engine and add it to the current contents of the accumulation buffer 2004. In this manner, the accumulation buffer 2004 accumulates the results of the convolution engine 2002. Although a single accumulation buffer 2004 is shown in FIG. 20, in other examples there may be multiple (e.g. 8, one per convolution engine) accumulation buffers. The accumulation buffer 2004 outputs the accumulated result to the element-wise operations module 2006 which may or may not operate on the accumulated result depending on whether an element-wise layer is to be processed during the current hardware pass.

The element-wise operations module 2006 is configured to receive either the input data for the current hardware pass (e.g. when a convolution layer is not processed in the current hardware pass) or the accumulated result from the accumulation buffer 2004 (e.g. when a convolution layer is processed in the current hardware pass). The element-wise operations module 2006 may either process the received input data or pass the received input data to another module (e.g. the activation module 2008 and/or or the normalisation module 2010) depending on whether an element-wise layer is processed in the current hardware pass and/or depending on whether an activation layer is to be processed prior to an element-wise layer. When the element-wise operations module 2006 is configured to process the received input data the element-wise operations module 2006 performs an element-wise operation on the received data (optionally with another data set (which may be obtained from external memory)). The element-wise operations module 2006 may be configured to perform any suitable element-wise operation such as, but not limited to add, multiply, maximum, and minimum. The result of the element-wise operation is then provided to either the activation module 2008 or the normalisation module 2010 depending on whether an activation layer is to be processed subsequent the element-wise layer or not.

The activation module 2008 is configured to receive one of the following as input data: the original input to the hardware pass (via the element-wise operations module 2006) (e.g. when a convolution layer is not processed in the current hardware pass); the accumulated data (via the element-wise operations module 2006) (e.g. when a convolution layer is not processed in the current hardware pass and either an element-wise layer is not processed in the current hardware pass or an element-wise layer is processed in the current hardware pass but follows an activation layer). The activation module 2008 is configured to apply an activation function to the input data and provide the output data back to the element-wise operations module 2006 where it is forwarded to the normalisation module 2010 directly or after the element-wise operations module 2006 processes it. In some cases, the activation function that is applied to the data received by the activation module 2008 may vary per activation layer. In these cases, information specifying one or more properties of an activation function to be applied for each activation layer may be stored (e.g. in memory) and the relevant information for the activation layer processed in a particular hardware pass may be provided to the activation module 2008 during that hardware pass.

In some cases, the activation module 2008 may be configured to store, in entries of a lookup table, data representing the activation function. In these cases, the input data may be used to lookup one or more entries in the lookup table and output values representing the output of the activation function. For example, the activation module 2008 may be configured to calculate the output value by interpolating between two or more entries read from the lookup table.

In some examples, the activation module 2008 may be configured to operate as a Rectified Linear Unit (ReLU) by implementing a ReLU function. In a ReLU function, the output element $y_{i,j,k}$ is calculated by identifying a maximum value as set out in equation (17) wherein for x values less than 0, y=0:

$$y_{i,j,k} = f(x_{i,j,k}) = \max\{0, x_{i,j,k}\} \quad (17)$$

In other examples, the activation module 2008 may be configured to operate as a Parametric Rectified Linear Unit (PReLU) by implementing a PReLU function. The PReLU function performs a similar operation to the ReLU function. Specifically, where $w_1$, $w_2$, $b_1$, $b_2 \in \mathbb{R}$ are constants, the PReLU is configured to generate an output element $y_{i,j,k}$ as set out in equation (18):

$$y_{i,j,k} = f(x_{i,j,k}; w_1, w_2, b_1, b_2) = \max\{(w_1 * x_{i,j,k} + b_1), (w_2 * x_{i,j,k} + b_2)\} \quad (18)$$

The normalisation module 2010 is configured to receive one of the following as input data: the original input data for the hardware pass (via the element-wise operations module 2006) (e.g. when a convolution layer is not processed in the current hardware pass and neither an element-wise layer nor an activation layer is processed in the current hardware pass); the accumulation output (via the element-wise operations module 2006) (e.g. when a convolution layer is processed in the current hardware pass and neither an element-wise layer nor an activation layer is processed in the current hardware pass); and the output data of the element-wise operations module and/or the activation module. The normalisation module 2010 then performs a normalisation function on the received input data to produce normalised data. In some cases, the normalisation module 2010 may be configured to perform a Local Response Normalisation (LRN) Function and/or a Local Contrast Normalisation (LCN) Function. However, it will be evident to a person of skill in the art that these are examples only and that the normalisation module 2010 may be configured to implement any suitable normalisation function or functions. Different normalisation layers may be configured to apply different normalisation functions.

The pooling module 2012 may receive the normalised data from the normalisation module 2010 or may receive the input data to the normalisation module 2010 via the normalisation module 2010. In some cases, data may be transferred between the normalisation module 2010 and the pooling module 2012 via an XBar 2018. The term "XBar" is used herein to refer to a simple hardware module that contains routing logic which connects multiple modules together in a dynamic fashion. In this example, the XBar may dynamically connect the normalisation module 2010, the pooling module 2012 and/or the output interleave module 2014 depending on which layers will be processed in the current hardware pass. Accordingly, the XBar may receive information each hardware pass indicating which modules 2010, 2012, 2014 are to be connected.

The pooling module 2012 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The output interleave module 2014 may receive the normalised data from the normalisation module 2010, the input data to the normalisation function (via the normalisation module 2010), or the pooled data from the pooling module 2012. In some cases, the data may be transferred between the normalisation module 2010, the pooling module 2012 and the output interleave module 2014 via an XBar 2018. The output interleave module 2014 is configured to perform a rearrangement operation to produce data that is in a predetermined order. This may comprise sorting and/or transposing the received data. The data generated by the last of the layers is provided to the output module 2015 where it is converted to the desired output format for the current hardware pass.

The normalisation module 2010, the pooling module 2012, and the output interleave module 2014 may each have access to a shared buffer 2020 which can be used by these modules 2010, 2012 and 2014 to write data to and retrieve data from. For example, the shared buffer 2020 may be used by these modules 2010, 2012, 2014 to rearrange the order of the received data or the generated data. For example, one or more of these modules 2010, 2012, 2014 may be configured to write data to the shared buffer 2020 and read the same data out in a different order. In some cases, although each of the normalisation module 2010, the pooling module 2012 and the output interleave module 2014 have access to the shared buffer 2020, each of the normalisation module 2010, the pooling module 2012 and the output interleave module 2014 may be allotted a portion of the shared buffer 2020 which only they can access. In these cases, each of the normalisation module 2010, the pooling module 2012 and the output interleave module 2014 may only be able to read data out of the shared buffer 2020 that they have written in to the shared buffer 2020.

As described above the modules of the DNN accelerator 2000 that are used or active during any hardware pass are based on the layers that are processed during that hardware pass. In particular, only the modules or components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the DNN accelerator 2000 may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first convolution layer needs to be written out to memory before it can be used as an input to the second convolution layer. In each of these hardware passes only the modules, components or engines relevant to a convolution layer, such as the convolution engine 2002 and the accumulation buffer 2004, may be used or active.

Although the DNN accelerator 2000 of FIG. 20 illustrates a particular order in which the modules, engines etc. are arranged and thus how the processing of data flows through the processing module, it will be appreciated that this is an example only and that in other examples the modules, engines etc. may be arranged in a different manner. Furthermore, other DNN hardware accelerators may support additional or alternative types of DNN layers and thus may comprise different modules, engines etc.

Figure 21:
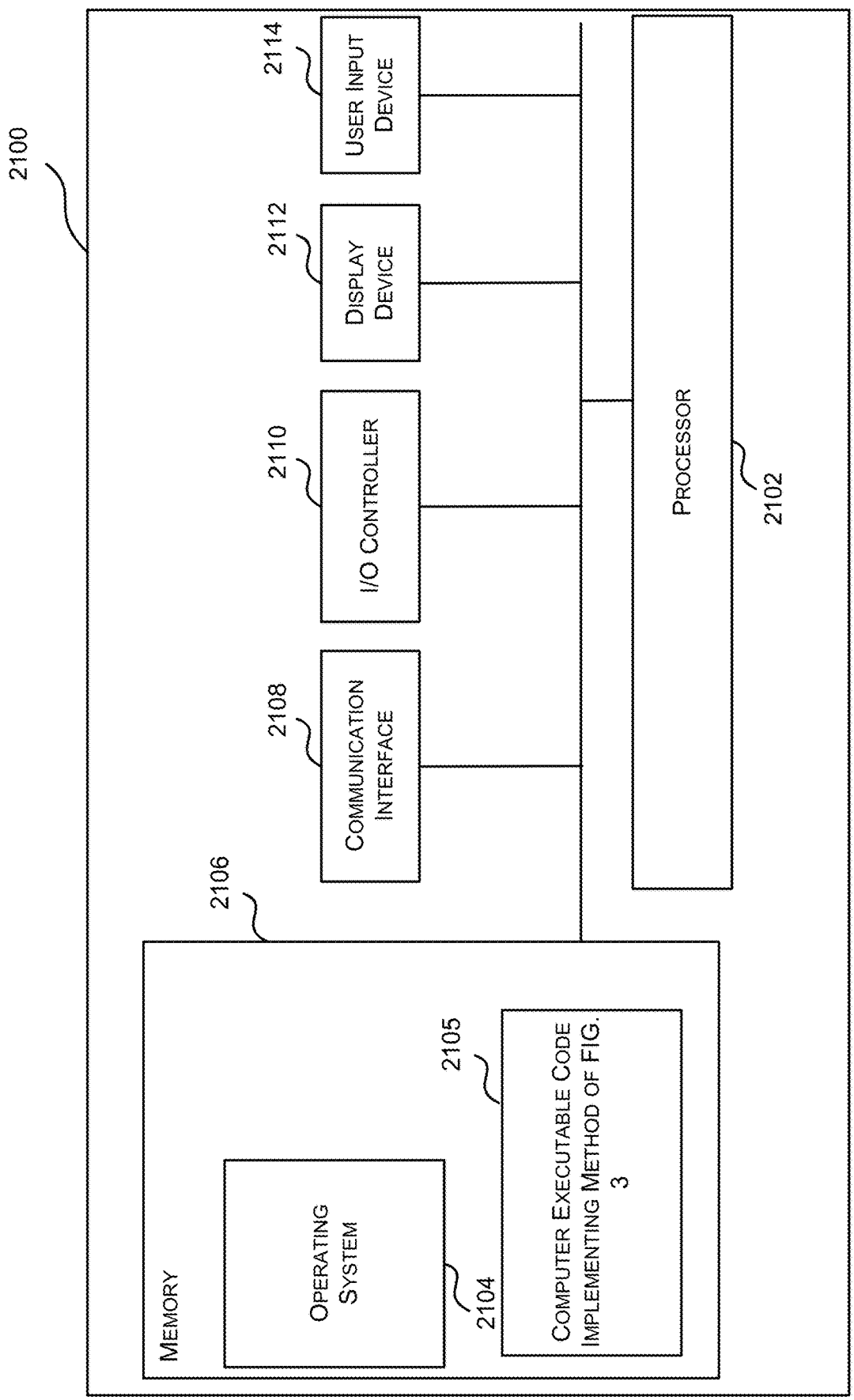
FIG. 21 is a block diagram of an example computing-based device.

FIG. 21 illustrates various components of an exemplary general-purpose computing-based device 2100 which may be implemented as any form of a computing and/or electronic device, and in which all or a portion of the method 300 of FIG. 3 may be implemented.

Computing-based device 2100 comprises one or more processors 2102 which may be microprocessors, controllers or any other suitable type of processors for processing computer executable instructions to implement a traditional computer vision algorithm as a neural network. In some examples, for example where a system on a chip architecture is used, the processors 2102 may include one or more fixed function blocks (also referred to as accelerators) which implement a part of the method of implementing a traditional computer vision algorithm as a neutral network (rather than software or firmware). Platform software comprising an operating system 2104 or any other suitable platform software may be provided at the computing-based device to enable application software, such as computer executable code 2105 for implementing all or a portion of the method 300 of FIG. 3, to be executed on the device.

The computer executable instructions may be provided using any computer-readable media that is accessible by computing-based device 2100. Computer-readable media may include, for example, computer storage media such as memory 2106 and communications media. Computer storage media (i.e. non-transitory machine readable media), such as memory 2106, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 2106) is shown within the computing-based device 2100 it will be appreciated that the storage may be distributed or located remotely and accessed via a network or other communication link (e.g. using communication interface 2108).

The computing-based device 2100 also comprises an input/output controller 2110 arranged to output display information to a display device 2112 which may be separate from or integral to the computing-based device 2100. The display information may provide a graphical user interface. The input/output controller 2110 is also arranged to receive and process input from one or more devices, such as a user input device 2114 (e.g. a mouse or a keyboard). In an embodiment the display device 2112 may also act as the user input device 2114 if it is a touch sensitive display device. The input/output controller 2110 may also output data to devices other than the display device, e.g. a locally connected printing device (not shown in FIG. 21).

Figure 22:
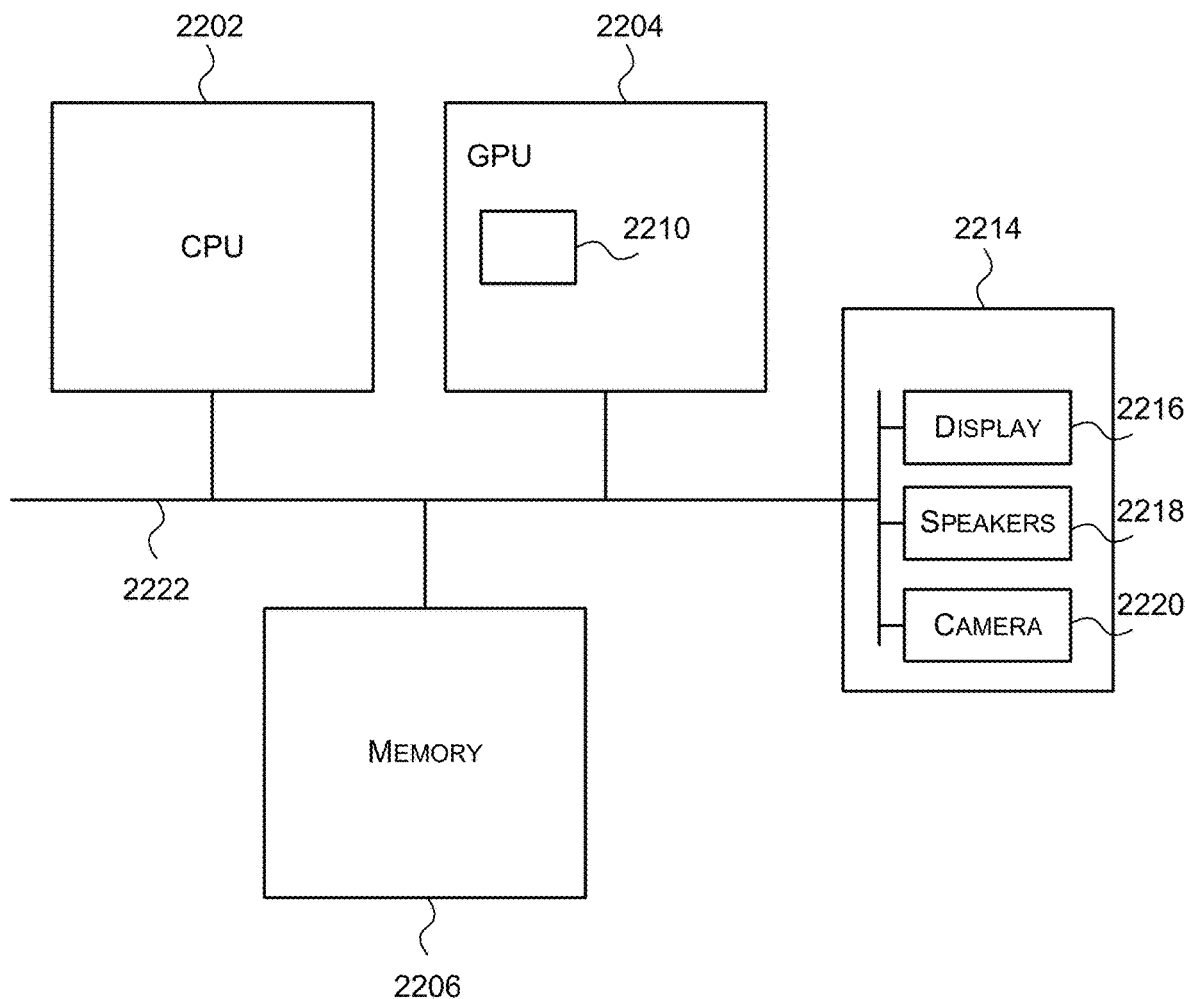
FIG. 22 is a block diagram of an example computer system in which the DNN accelerator of FIG. 20 may be implemented.

FIG. 22 shows a computer system in which a DNN hardware accelerator, such as the DNN accelerator 2000 of FIG. 20, may be implemented. The computer system comprises a CPU 2202, a GPU 2204, a memory 2206 and other devices 2214, such as a display 2216, speakers 2218 and a camera 2220. A DNN accelerator 2210 (e.g. corresponding to the DNN accelerator 2000 of FIG. 20) may be implemented on the GPU 2204, as shown in FIG. 22. In some examples, there may not be a GPU and the CPU may provide control information to the DNN accelerator 2210. The components of the computer system can communicate with each other via a communications bus 2222. In other examples, the DNN accelerator 2210 may be implemented independent from the CPU or the GPU and may have a separate connection to the communications bus 2222.

The system and DNN accelerator of FIGS. 4 and 20 respectively are shown as comprising a number of functional blocks. This is schematic only and is not intended to define a strict division between different logic elements of such entities. Each functional block may be provided in any suitable manner. It is to be understood that intermediate values described herein as being formed by the system or accelerator need not be physically generated by the system or accelerator at any point and may merely represent logical values which conveniently describe the processing performed by the system or accelerator between its input and output.

The DNN accelerator described herein may be embodied in hardware on an integrated circuit. The computing-based device described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a DNN accelerator comprising any apparatus described herein. An integrated circuit definition dataset may be, for example, an integrated circuit description.

Therefore, there may be provided a method of manufacturing, at an integrated circuit manufacturing system, a DNN accelerator as described herein. Furthermore, there may be provided an integrated circuit definition dataset that, when processed in an integrated circuit manufacturing system, causes the method of manufacturing a DNN accelerator to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a DNN accelerator will now be described with respect to FIG. 23.

Figure 23:
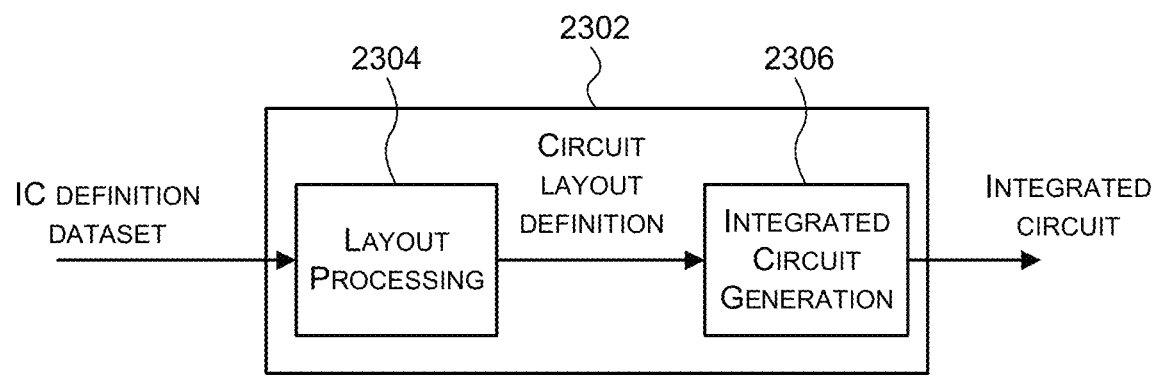
FIG. 23 is a block diagram of an example integrated circuit manufacturing system for generating an integrated circuit embodying the DNN accelerator of FIG. 20.

FIG. 23 shows an example of an integrated circuit (IC) manufacturing system 2302 which is configured to manufacture a DNN accelerator as described in any of the examples herein. In particular, the IC manufacturing system 2302 comprises a layout processing system 2304 and an integrated circuit generation system 2306. The IC manufacturing system 2302 is configured to receive an IC definition dataset (e.g. defining a DNN accelerator as described in any of the examples herein), process the IC definition dataset, and generate an IC according to the IC definition dataset (e.g. which embodies a DNN accelerator as described in any of the examples herein). The processing of the IC definition dataset configures the IC manufacturing system 2302 to manufacture an integrated circuit embodying a DNN accelerator as described in any of the examples herein.

The layout processing system 2304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2304 has determined the circuit layout it may output a circuit layout definition to the IC generation system 2306. A circuit layout definition may be, for example, a circuit layout description.

The IC generation system 2306 generates an IC according to the circuit layout definition, as is known in the art. For example, the IC generation system 2306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2306 may be in the form of computer-readable code which the IC generation system 2306 can use to form a suitable mask for use in generating an IC.

The different processes performed by the IC manufacturing system 2302 may be implemented all in one location, e.g. by one party. Alternatively, the IC manufacturing system 2302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a DNN accelerator without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 23 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 23, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of implementing a traditional computer vision algorithm as a neural network, the method comprising:
    receiving a definition of the traditional computer vision algorithm that identifies a sequence of one or more traditional computer vision algorithm operations which form the traditional computer vision algorithm;
    mapping each of the one or more traditional computer vision algorithm operations to a set of one or more neural network primitives that is mathematically equivalent to that traditional computer vision algorithm operation;
    linking the set of one or more neural network primitives mapped to each traditional computer vision algorithm operation according to the sequence to form a neural network representing the traditional computer vision algorithm; and
    configuring hardware logic capable of implementing a neural network to implement the neural network that represents the traditional computer vision algorithm.

2. The method of claim 1, wherein at least one of the traditional computer vision algorithm operations is a histogram operation and the histogram operation is mapped to a convolution primitive, an activation primitive and a pooling primitive.

3. The method of claim 2, wherein the convolution primitive is configured to convolve an input to the histogram operation with h 1×1×1 filters wherein h is a number of bins in the histogram.

4. The method of claim 1, wherein at least one of the traditional computer vision algorithm operations is a dilation operation and the dilation operation is mapped to a convolution primitive and an activation primitive.

5. The method of claim 1, wherein at least one of the traditional computer vision algorithm operations is a dilation operation with a square structuring element and the dilation operation with a square structuring element is mapped to a pooling primitive.

6. The method of claim 1, wherein at least one of the traditional computer vision algorithm operations is an erosion operation and the erosion operation is mapped to a convolution primitive and an activation primitive.

7. The method of claim 1, further comprising training, using one or more neural network training techniques, the neural network representing the traditional computer vision algorithm prior to configuring the hardware logic to implement the neural network.

8. The method of claim 1, wherein the mapping is automatically performed based on a library that comprises a mapping of traditional computer vision algorithm operations to mathematically equivalent sets of one or more neural network primitives.

9. The method of claim 1, wherein the traditional computer vision algorithm is a BRISK descriptor algorithm and the neural network comprises a single fully connected primitive.

10. The method of claim 9, wherein the fully connected primitive is configured to perform a matrix-vector multiplication between a matrix of weights and a vector of intensity values.

11. The method of claim 10, further comprising determining the weights of the matrix using one or more neural network training techniques.

12. The method of claim 1, wherein the hardware logic capable of implementing a neural network comprises a neural network accelerator.

13. The method of claim 12, wherein the neural network accelerator is embodied in hardware on an integrated circuit.

14. A non-transitory computer readable storage medium having stored thereon computer readable instructions that, when executed at a computer system, cause the computer system to perform the method at set forth in claim 1.

15. A system for implementing a traditional computer vision algorithm as a neural network, the system comprising:
hardware logic capable of implementing a neural network; and
a converter configured to:
receive a definition of the traditional computer vision algorithm that identifies a sequence of one or more traditional computer vision algorithm operations which form the traditional computer vision algorithm;
map each of the one or more traditional computer vision algorithm operations to a set of one or more neural network primitives that is mathematically equivalent to that traditional computer vision algorithm operation;
link the set of one or more neural network primitives mapped to each traditional computer vision algorithm operation according to the sequence to form a neural network representing the traditional computer vision algorithm; and
configure the hardware logic capable of implementing a neural network to implement the neural network that represents the traditional computer vision algorithm.

16. A neural network accelerator configured to implement a neural network that represents a traditional computer vision algorithm that is formed by a sequence of one or more traditional computer vision algorithm operations, the neural network having been generated by mapping each traditional computer vision algorithm operation forming the traditional computer vision algorithm to a mathematically equivalent set of one or more neural network primitives and linking the one or more neural network primitives mapped to each traditional computer vision algorithm operation according to the sequence to form the neural network that represents the traditional computer vision algorithm.

17. A computer-implemented automated tool for forming a neural network, the automated tool having access to a library of mappings from traditional computer vision algorithm operations to mathematically equivalent sets of one or more neural network primitives, wherein the automated tool is configured to:
receive a definition of a traditional computer vision algorithm that identifies a sequence of one or more traditional computer vision algorithm operations which form the traditional computer vision algorithm;
use the library to map each of the one or more traditional computer vision algorithm operations to a set of one or more neural network primitives that is mathematically equivalent to that traditional computer vision algorithm operation;
link the set of one or more neural network primitives mapped to each computer vision algorithm operation according to the sequence to form a neural network representing the traditional computer vision algorithm; and
output a definition of the neural network for use in configuring hardware logic to implement the neural network.

* * * * *